(12) United States Patent
Williams et al.

(10) Patent No.: US 11,592,209 B2
(45) Date of Patent: Feb. 28, 2023

(54) EJN WATER WARMER AND EJN COOKER

(71) Applicants: Nirline Williams, Pompano Beach, FL (US); Jean Evenson Laferriere, Pompano Beach, FL (US)

(72) Inventors: Nirline Williams, Pompano Beach, FL (US); Jean Evenson Laferriere, Pompano Beach, FL (US)

( * ) Notice: Subject to any disclaimer, the term of this patent is extended or adjusted under 35 U.S.C. 154(b) by 263 days.

(21) Appl. No.: 16/024,668

(22) Filed: Sep. 14, 2018

(65) Prior Publication Data
US 2020/0088443 A1 Mar. 19, 2020

(51) Int. Cl.
*F24H 9/20* (2022.01)
*F24H 1/00* (2022.01)
*F24H 1/18* (2022.01)
*A47J 27/00* (2006.01)
*A47J 27/08* (2006.01)
*A47J 36/06* (2006.01)
*H01M 10/0525* (2010.01)
*A47J 36/02* (2006.01)

(52) U.S. Cl.
CPC .......... *F24H 9/2007* (2013.01); *A47J 27/004* (2013.01); *A47J 27/08* (2013.01); *A47J 36/02* (2013.01); *A47J 36/06* (2013.01); *F24H 1/0072* (2013.01); *F24H 1/183* (2013.01); *H01M 10/0525* (2013.01); *H01M 2220/30* (2013.01)

(58) Field of Classification Search
CPC .. B23K 26/1435; B23K 26/146; A47J 27/004; A47J 27/04; A47J 36/06; A47J 36/32; A47J 2027/043
USPC .......... 219/121.84, 431, 401, 386, 209, 385, 219/429, 433, 446.1, 420, 438, 439, 441, 219/442, 687, 688; 122/13.01, 13.3, 19.1, 122/19.3
See application file for complete search history.

(56) References Cited

U.S. PATENT DOCUMENTS

| | | | | |
|---|---|---|---|---|
| 3,619,563 A * | 11/1971 | Hirst | ...................... | A47J 41/005 219/386 |
| 5,085,337 A * | 2/1992 | Kos | ..................... | B65D 43/0218 220/203.28 |
| 5,293,583 A * | 3/1994 | Chudgar | ............. | A47J 36/2483 206/541 |
| 5,507,385 A * | 4/1996 | Koloski | ................. | B25H 3/023 206/372 |
| 5,551,558 A * | 9/1996 | Bureau | ..................... | A45C 9/00 190/11 |
| 5,797,445 A * | 8/1998 | Westbrooks, Jr. | ..... | A47J 39/006 165/11.1 |
| 6,213,265 B1 * | 4/2001 | Wang | ....................... | A45C 9/00 190/11 |
| 6,550,102 B1 * | 4/2003 | Liang | ................... | A45C 13/262 16/113.1 |
| 6,606,937 B2 * | 8/2003 | Lassota | ................... | F28D 20/02 99/290 |
| D701,734 S * | 4/2014 | Wagner | ......................... | D7/605 |

* cited by examiner

Primary Examiner — Justin M Jonaitis

(57) ABSTRACT

A portable cooking device operable by electricity or by a rechargeable lithium Ion battery for use when electricity is or is not readily available.

1 Claim, 24 Drawing Sheets

EJN WATER WARMER AND EJN COOKER

BACKGROUND OF THE INVENTION

I live in Florida, when a hurricane hit us, sometimes I wish I had already invented the EJN WATER HEATER and EJN COOKER, and when I watch what hurricane Irma had done to Puerto Rico, and other disasters that I see EJN WATER HEATER and EJN COOKER will be great for, and other countries that have no electricity, EJN WATER HEATER and EJN COOKER is in advantage for all.

The known domestic storage heaters comprise a vessel of sufficient volume (up to 120 liters) which is heat-insulated on its outside and is provided a cool electric heating element and a thermostatic switch. The thermostat is set to the required high temperature and interrupts the electric current to the heating element when the design temperature has been reached, switching it on again as soon as the water temperature drops. It is noted that the water in the vessel is generally heated to a much higher temperature than that required for a bath or a shower, and that the hot water has to be mixed with cold water while running into the bath tub, as otherwise the vessel would be required to hold a much larger water volume. It is good to keep the water temperature as high as you like or warm, mix with cold water before uses to shower. Another point against keeping the water at a high temperature is that the vessel walls and the electric components are exposed to quicker wear and tear, which reduces the life expectancy of the water heater.

SUMMARY OF THE INVENTION

EJN Water Heater and EJN Cookers

These inventions provides an improved Water Heater and Cookers that never been invented. The invention relates to an electric/battery water heater adapted to store water at a comparatively low temperature and to heat the outflowing water to the desired high temperature. The known domestic storage heaters comprise a vessel of sufficient volume (up to 120 liters) which is heat-insulated on its outside and is provided a cool electric heating element and a thermostatic switch. The thermostat is set to the required high temperature and interrupts the electric current to the heating element when the design temperature has been reached, switching it on again as soon as the water temperature drops. It is noted that the water in the vessel is generally heated to a much higher temperature than that required for a bath or a shower, and that the hot water has to be mixed with cold water while running into the bath tub, as otherwise the vessel would be required to hold a much larger water volume. It is good to keep the water temperature as high as you like or warm, mix with cold water before uses to shower. Another point against keeping the water at a high temperature is that the vessel walls and the electric components are exposed to quicker wear and tear, which reduces the life expectancy of the water heater.

EJN WATER HEATER and EJN COOKERS will become quite popular for every household with electricity and without electricity, it will become popular for those who love to camp on camping sites, it will become popular for those who like to boil water and filter it for their babies, and with it lithium-ION battery will be a life saver for all.

The EJN WATER HEATER combines high quality stainless steel construction and energy efficient operation providing long draws of hot water without consuming large amounts of energy. A cleverly designed water connection directs cold water to the heating element near the bottom of the tank to minimize the mixing of cold and hot water. Durable components, low standby heat losses, high recovery rates, and the industry's strongest warranty make the EJN WATER HEATER an ideal choice for electric water heating needs.

EJN WATER HEATER and EJN COOKER will not only be popular, but wanted by everyone, with the use of electricity and lithium-ion battery, no one ever practices my invention before, the pipe in this invention contain a filter inside that will allow you to filter and drink your water, you can filter your water into the EJN WATER HEATER LARGE BOWL DISPENSER. However, the water heater cannot be used in counter height cabinets, it will be very difficult to install, and because the vapor outlet will be use while using the heater. Accordingly, my invention come with its own feet and button to fold the feet and control panel for both electricity and battery using.

EJN WATER HEATER: Is a warmer that is use as both electricity and batteries, it can be used to heat up water, warm water, boil water, etc. It can also use as a filter, and for some countries that sometimes boil water then filter it in a bowl to drink, well with EJN WATER HEATER you can boil the water and filter it through its pipe. When there's no electricity you can warm water to shower and as all these disasters going in a few of our States and other countries, like Volcanoes and hurricane in Hawaii, fire in California, etc. with no electricity just use the batteries in the EJN WATER HEATER, and the batteries will last up to 12 hours and you can recharge the batteries on the EJN CHARGER that come with the heater.

BRIEF DESCRIPTION OF THE DRAWINGS

FIG. 9 is a view of the first cooker that can use to cook any type of foods, and can also use as a deep fryer to fry anything you will like to.

DETAILED DESCRIPTION OF THE PREFERRED EMBODIMENT

The EJN WATER HEATER combines high quality stainless steel construction and energy efficient operation providing long draws of hot water without consuming large amounts of energy. A cleverly designed water connection directs cold water to the heating element near the bottom of the tank to minimize the mixing of cold and hot water. Durable components, low standby heat losses, high recovery rates, and the industry's strongest warranty make the EJN WATER HEATER an ideal choice for electric water heating needs.

EJN WATER HEATER: Is a warmer that is use as both electricity and batteries, it can be used to heat up water, warm water, boil water, etc. It can also use as a filter, and for some countries that sometimes boil water then filter it in a bowl to drink, well with EJN WATER HEATER you can boil the water and filter it through its pipe. When there's no electricity you can warm water to shower and as all these disasters going in a few of our States and other countries, like Volcanoes and hurricane in Hawaii, fire in California, etc. with no electricity just use the batteries in the EJN WATER HEATER, and the batteries will last up to 12 hours and you can recharge the batteries on the EJN CHARGER that come with the heater.

EJN COOKERS are cookers that comes with both electricity and lithium-ion batteries, that can be used to cook food, fry food, etc. It is a food grade hard outside Plastic and stainless steel interior. This cooker can be used to go camping and cook in it your favorite meal under the Moonlight using just the battery. Imagine there's no electricity and you need to cook something for yourself or your family EJN COOKERS is the way to go, the battery can last Up 12 hours and if you need to charge the EJN CHARGER that come with the cooker and the battery are great for charging. EJN COOKER is a Great quality pan that can be used to create healthier meals and foods such as meats, stew, vegetables, fish, pasta, noodles, rice, beans and more . . . .

EJN BATTERY: Is the battery that comes with the EJN WATER HEATER And EJN COOKER, it last up to 12 hours and it's rechargeable EJN CHARGERS: Is the charger that is to charge the EJN WATER HEATER and EJN COOKERS Battery, it work with an electric cord and 3 CR123A Batteries and you can use 3 CR123A Batteries to use the Charger to charge when there's no electricity.

Figure 1:
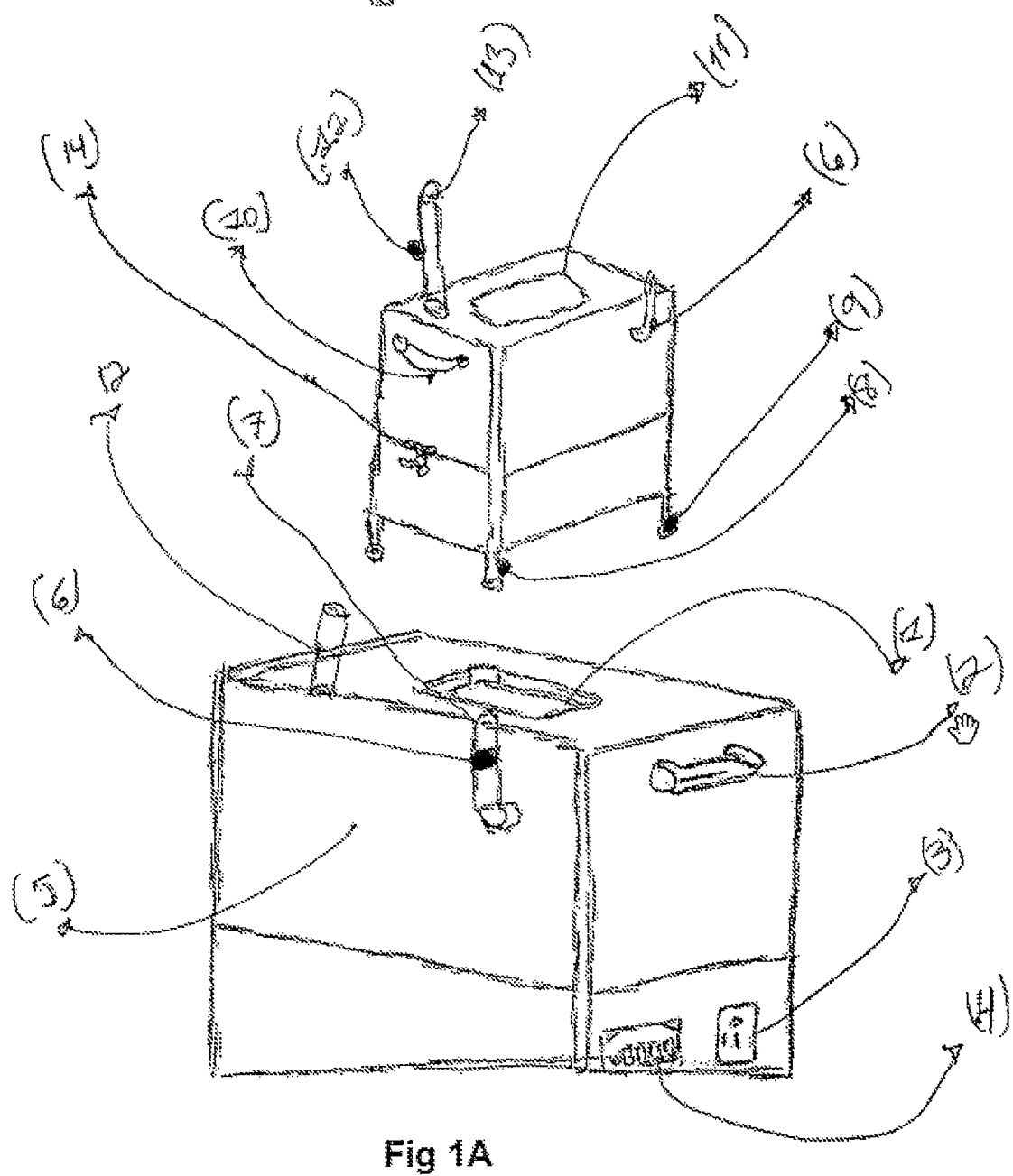
FIGS. 1a and 1b are perspective views of the water heater showing the invention's back side, left side, right side, and top side.

The EJN WATER HEATER contains four legs, two handles, its own pipe to drain water, as seen in FIGS. 1*a* and 1*b* have two sections are the forms of the square and show the full design of the heater. (FIGS. 1A and B number 1-14) FIG. 1A The cold-water inlet (1) The cool handle to lift the heater off the ground (2) Magnetic socket for the power cable inlet/insert (3) The Lithium-ION Battery inlet/insert socket (4) The back of the EJN WATER HEATER (5) The button in the back to make the cool handle goes in, when not needed (6) The connection of the handle to the water heater (7). Also seen in FIG. 1B the button to push for the legs to go in if not in need of use of them "example like putting the heater on the counter (8) the design of the legs (9)

The right side of the cool handle (10) Lift top to pour in the cold water (11) the button to push to fold the vapor outlet (12). The vapor outlet (13). The tank drainpipe (14)

Figure 2:
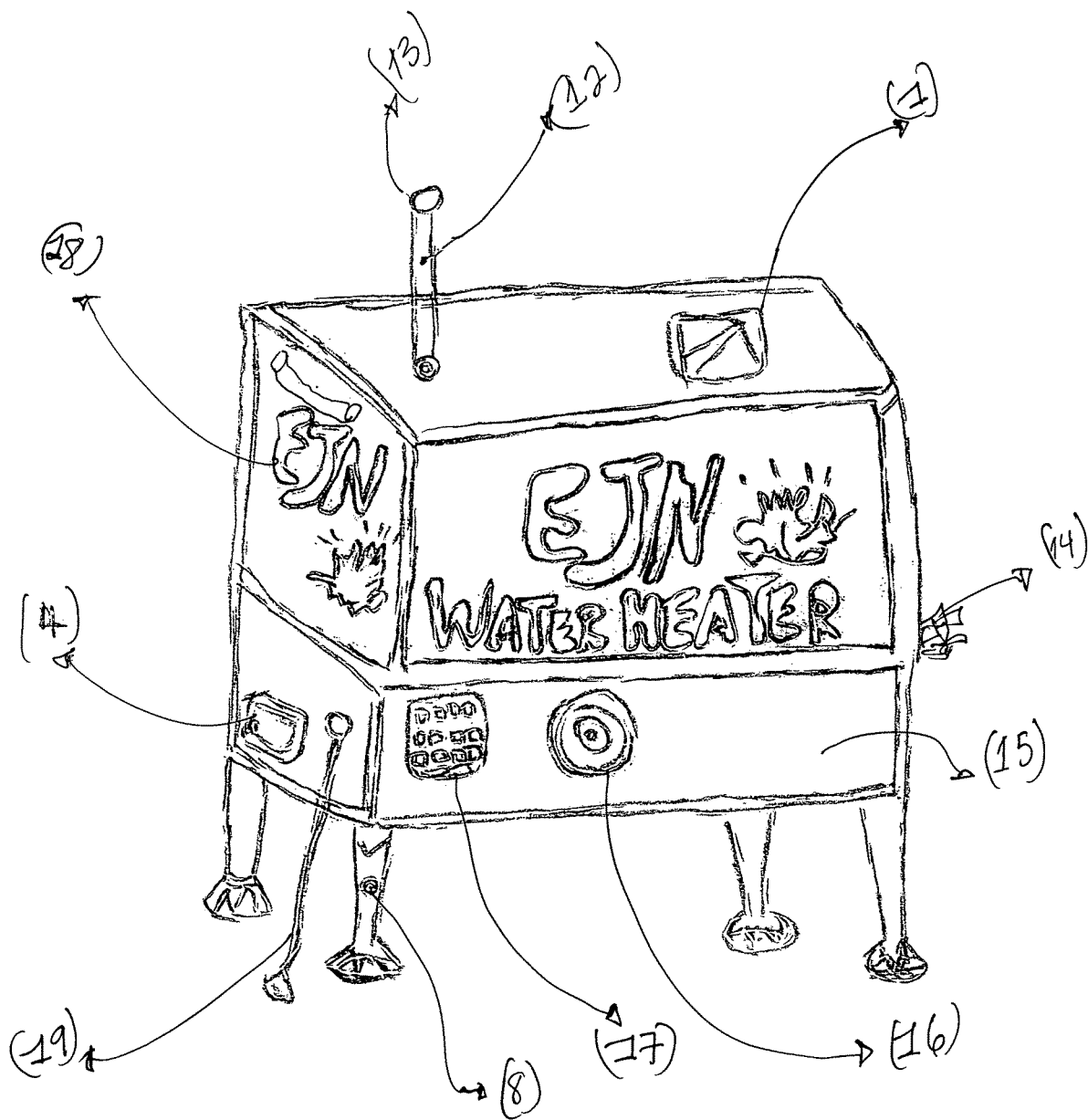
FIG. 2 is a front view of the water heater.

The EJN WATER HEATER have a very beautiful design as seen in FIG. 2 showing the full designs. The tank drainpipe (14) Front outer glass (15) The control panel (16) The Digital Control Panel (17) Left side outer glass (18) Power Cable/Extreme electric Cord for the magnetic power cable inlet (19) Button to fold feet (8) Lithium-ION Battery Insert (4) Lift Top (11) Button to fold the water vapor as seen on FIG. 1 (12) Vapor Outlet (13) Lithium-ION Battery Insert (4)

Figure 3:
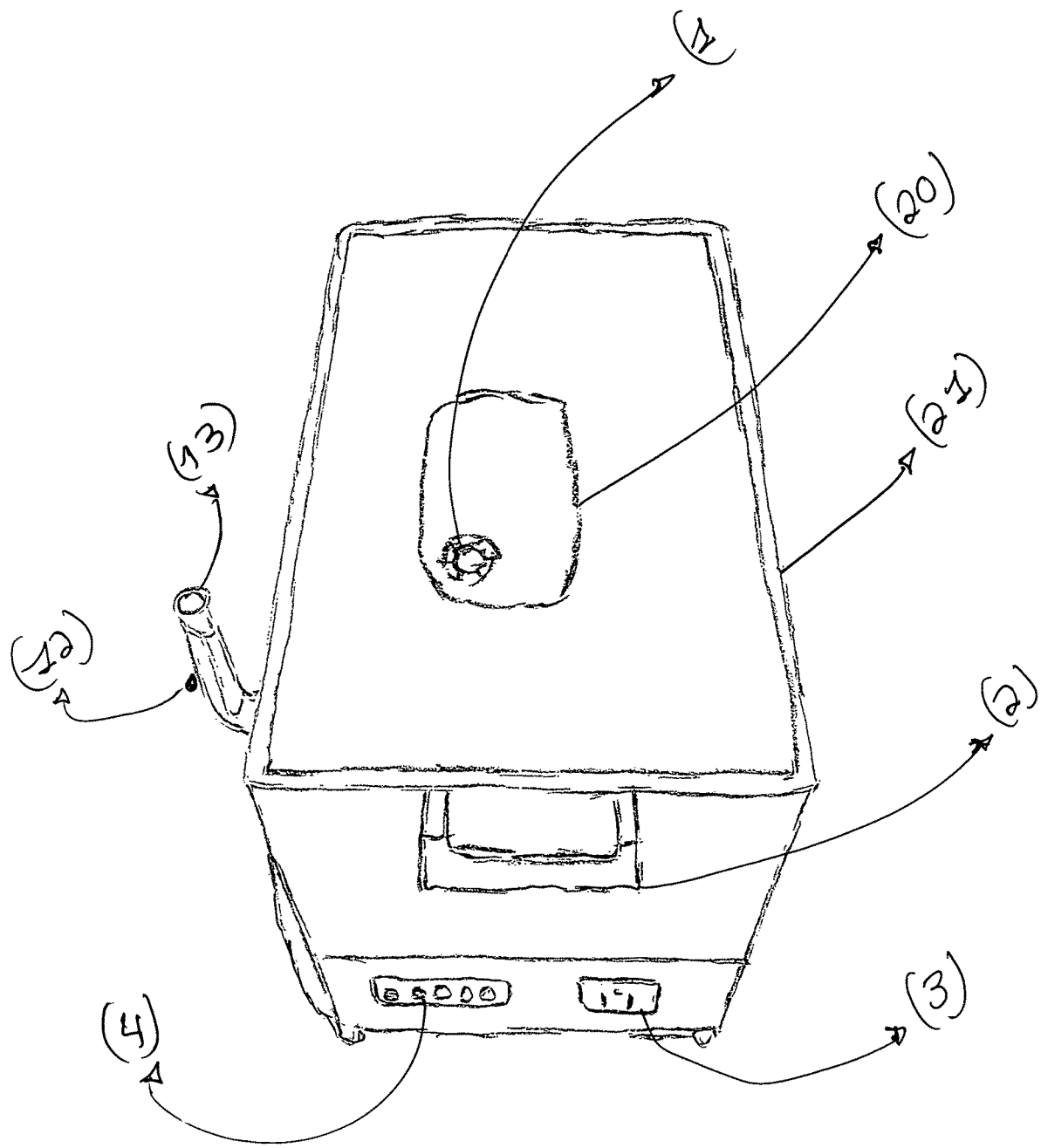
FIG. 3 is a view showing the water heater top side and left side.

As seen in FIG. 3 the EJN WATER HEATER shows the full top and right side. Power cable inlet (3) The Lithium-ION Battery inlet/insert socket (4). The cool handle (2) to lift the heater off the ground. Lift top (11) to pour in the cold water. Vapor Outlet (13). Button (12) to fold the water vapor outlet (13). Corner of the lift top (20) Hard Corner Top (21).

Figure 4:
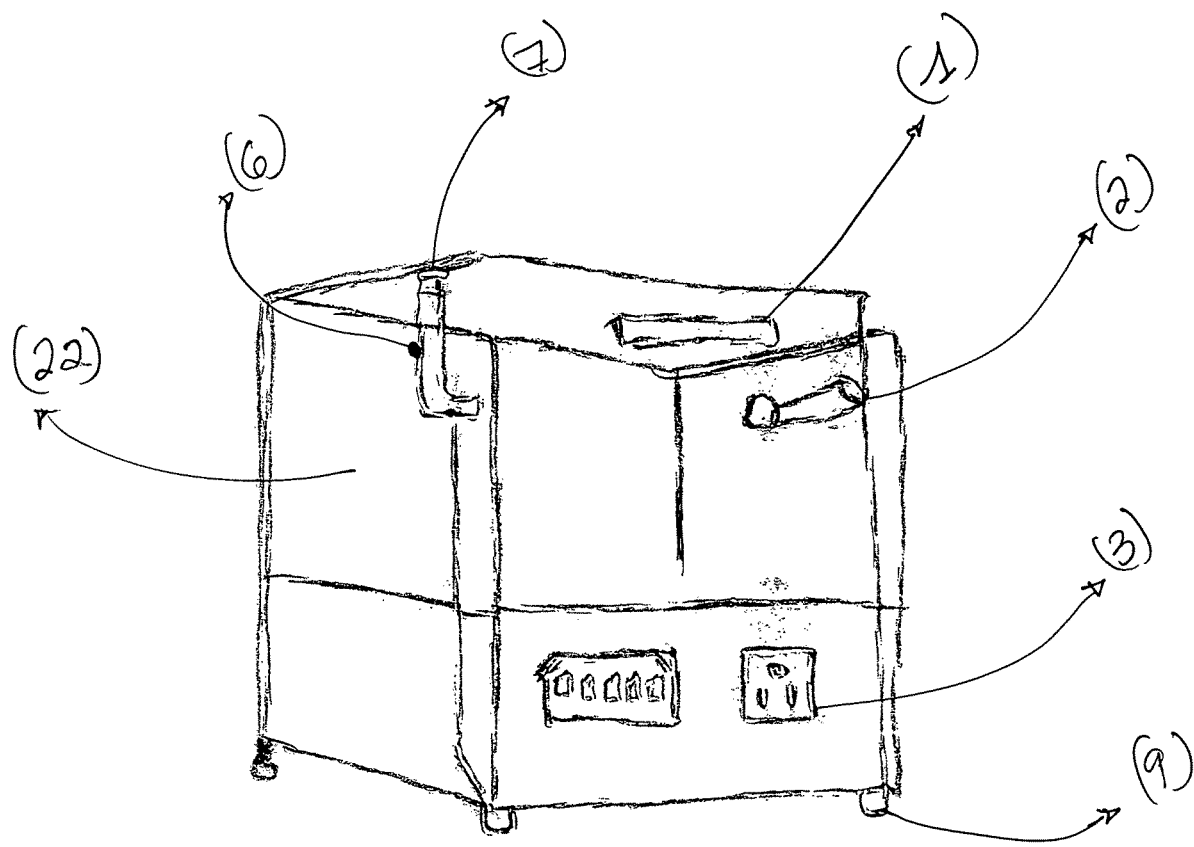
FIG. 4 is a view of the water heater upside, back side, and left side.

As seen in FIG. 4 the different sides of the EJN WATER HEATER. The cold-water inlet (1). The cool handle (2) to lift the heater off the ground. Magnetic socket for the power cable inlet/insert (3) The Lithium-ION Battery inlet/insert socket (4) the button in the back (6) to make the cool handle go in when not needed. The connection of the handle (7) to the water heater. The design of the leg (9) and the back outer glass (22).

Figure 5:
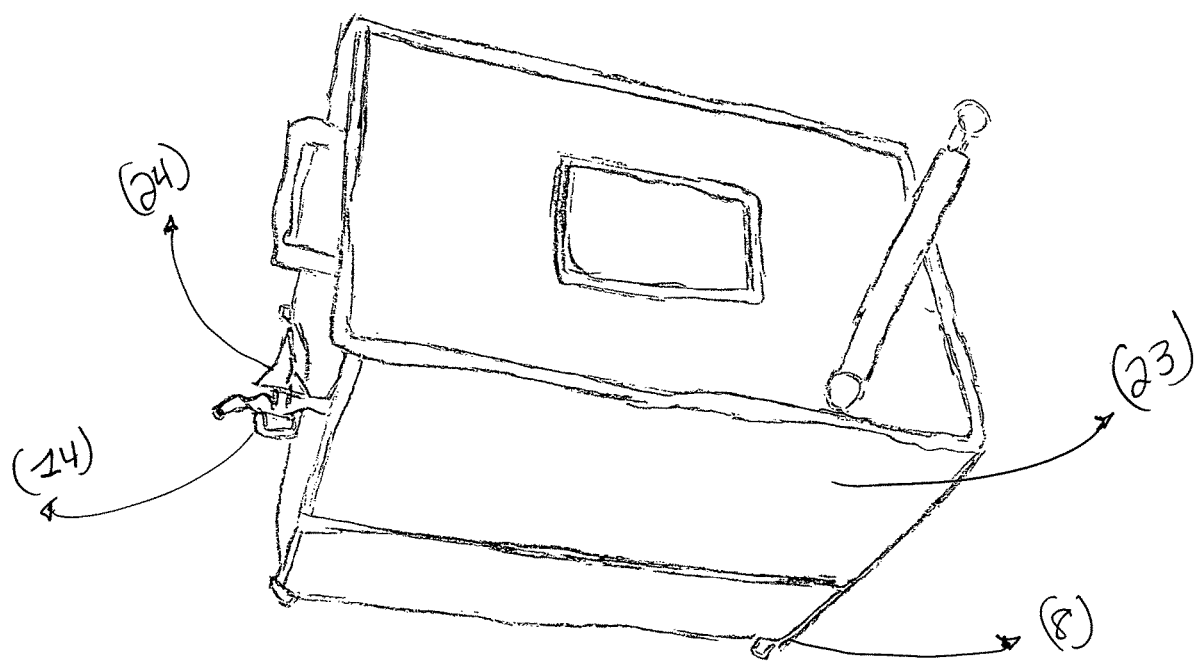
FIG. 5 is a perspective view of the water heater top side right side and the back side showing the drain pipe.

The amazing design as seen in FIG. 5. The button (8) to push for the legs (9) to go in if not in need of use of them "example like putting the heater on the counter. The tank drainpipe (14) Turn Top (24) of the drain pipe (14). The left back (23) the Heater. Button (8) to fold feet. 1

Figure 6:
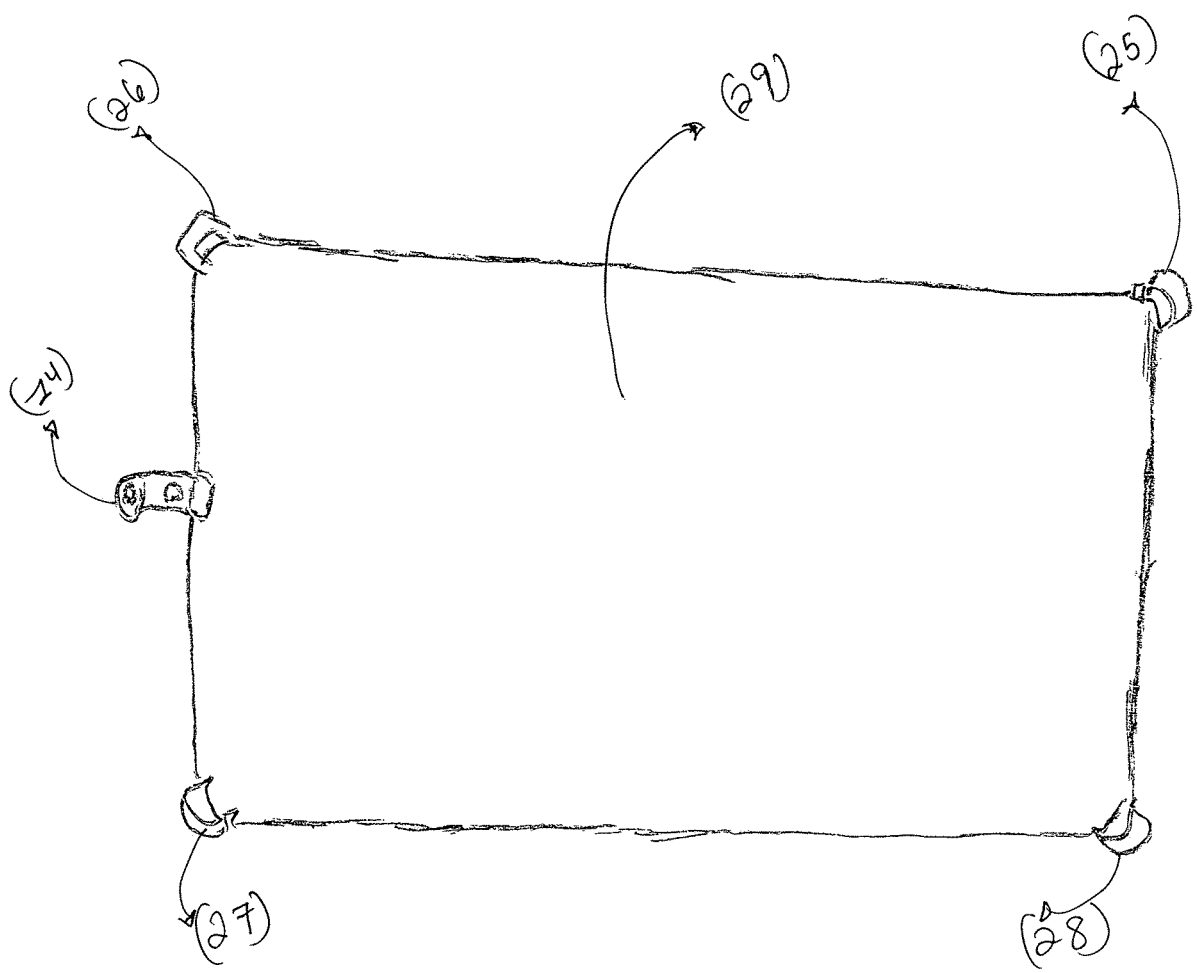
FIG. 6 is a full view of the water heater bottom with its four legs.

You can see the full bottom of the EJN WATER HEATER in FIG. 6 (FIG. 6 continued with number 25-29) FIG. 6. The tank drains water pipe (14) Front left leg (25), the front right leg (26), the back left leg (27), the back right leg (28) and the bottom of the invention (29)

Figure 7:
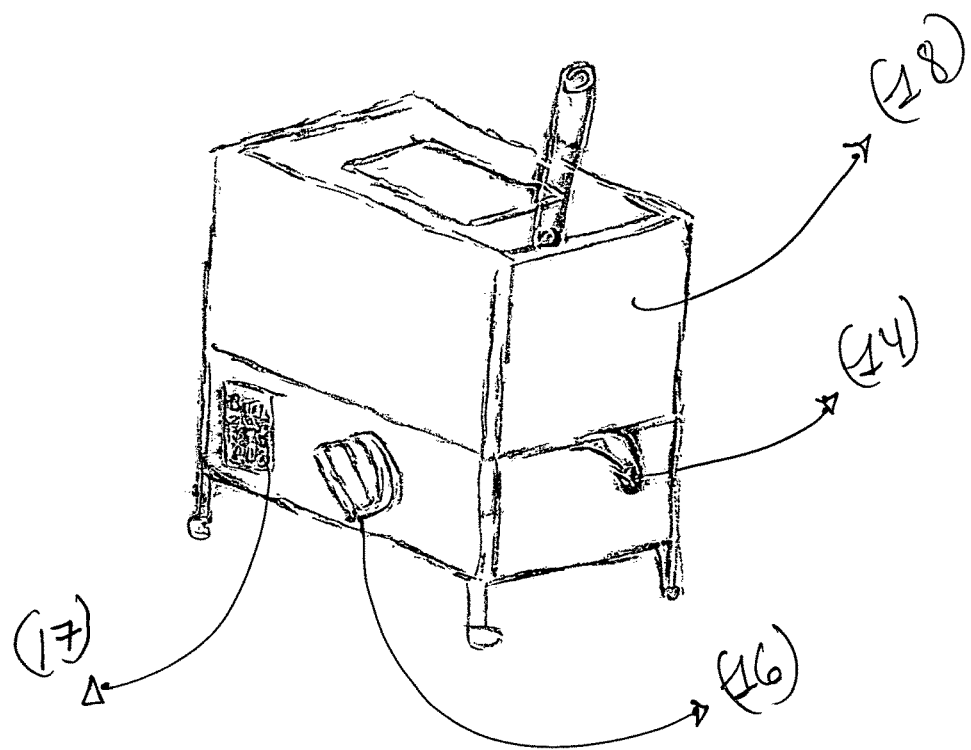
FIG. 7 is a view of the water heater front side, right side, and top side.

The invention shows its right side in FIG. 7. The tank drainpipe (14), the control panel (16), digital control panel (17), Left Side outer glass (18).

Figure 8:
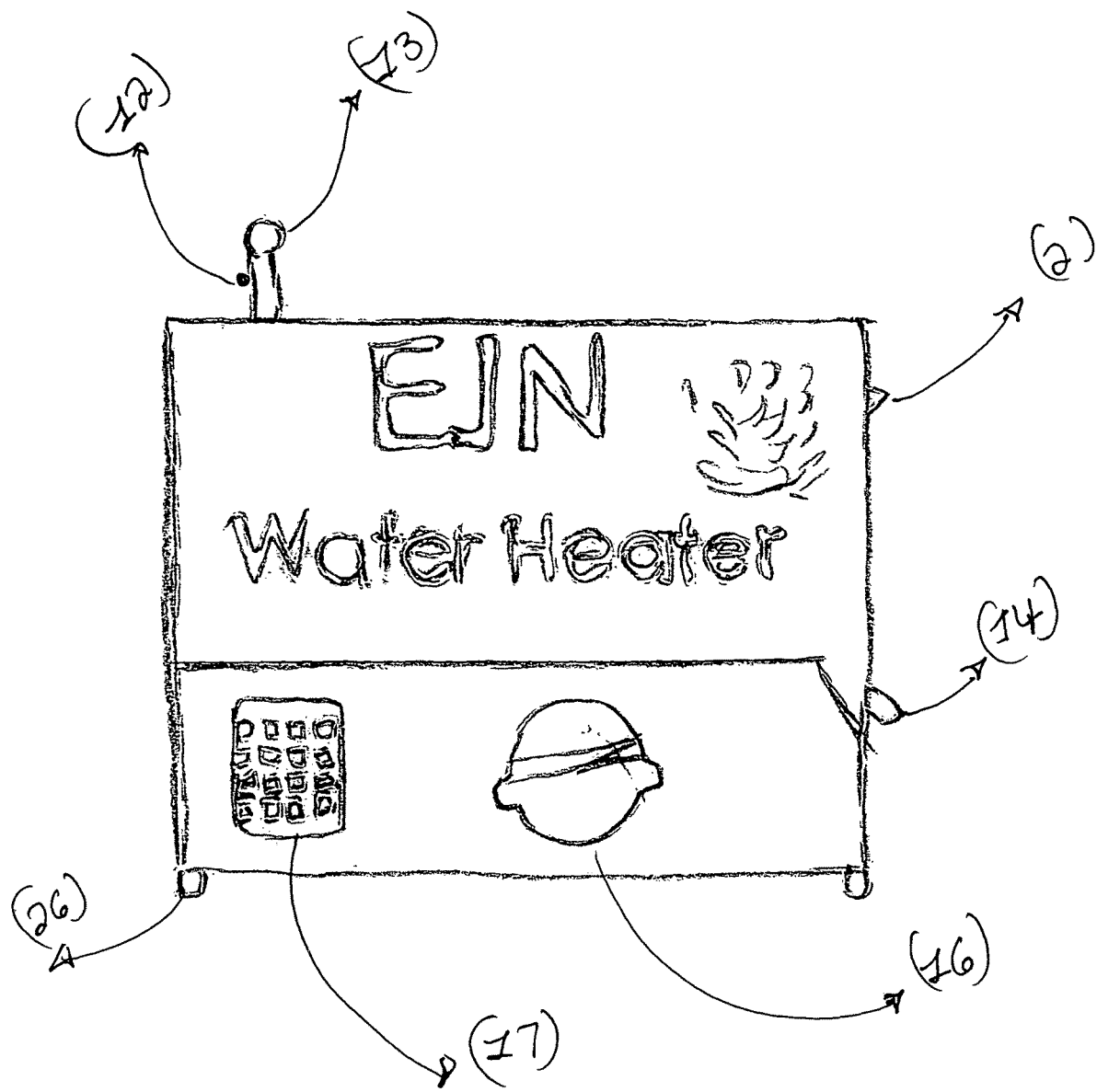
FIG. 8 is a view showing the front of the water heater.
Figure 9:
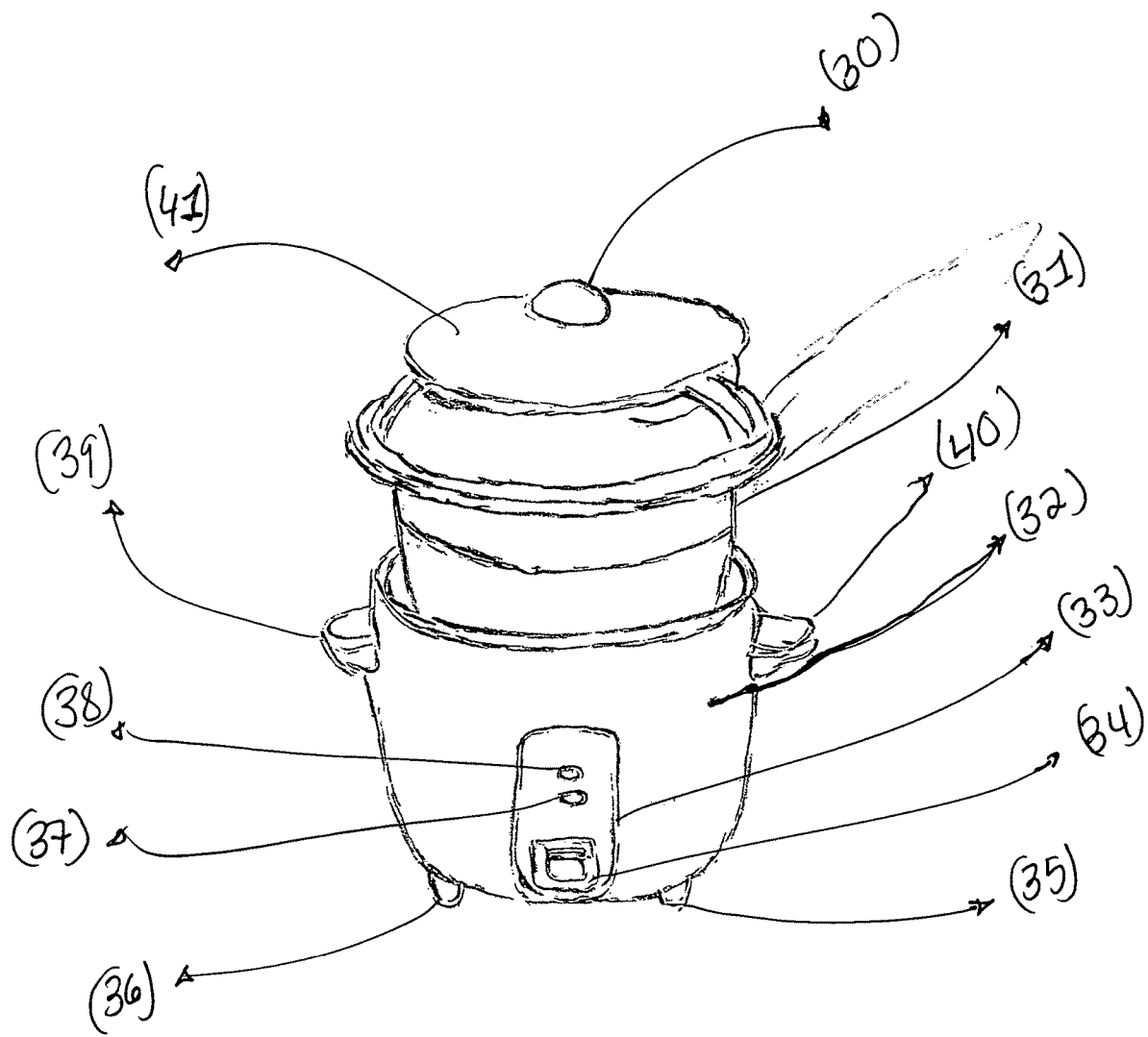

FIG. 8 shows the full design of the front button (12) to fold the water vapor. Vapor Outlet (13). The tank drainpipe (14). The control panel (16). Digital Control Panel (17). The front right leg (26).

The EJN COOKER has cool Lid handle (30) The Frying Pan/Net (removable) (31) the cooker housing (32) The Control Panel (33) The Cook switch (34) the right front feet (35) the left front feet (36) The Cooking indicator lamp (37) The Warming indicator lamp (38). Left Handles (39) Right Handles (40) The Glass Temperature Lid (removable) (41).

Figure 10:
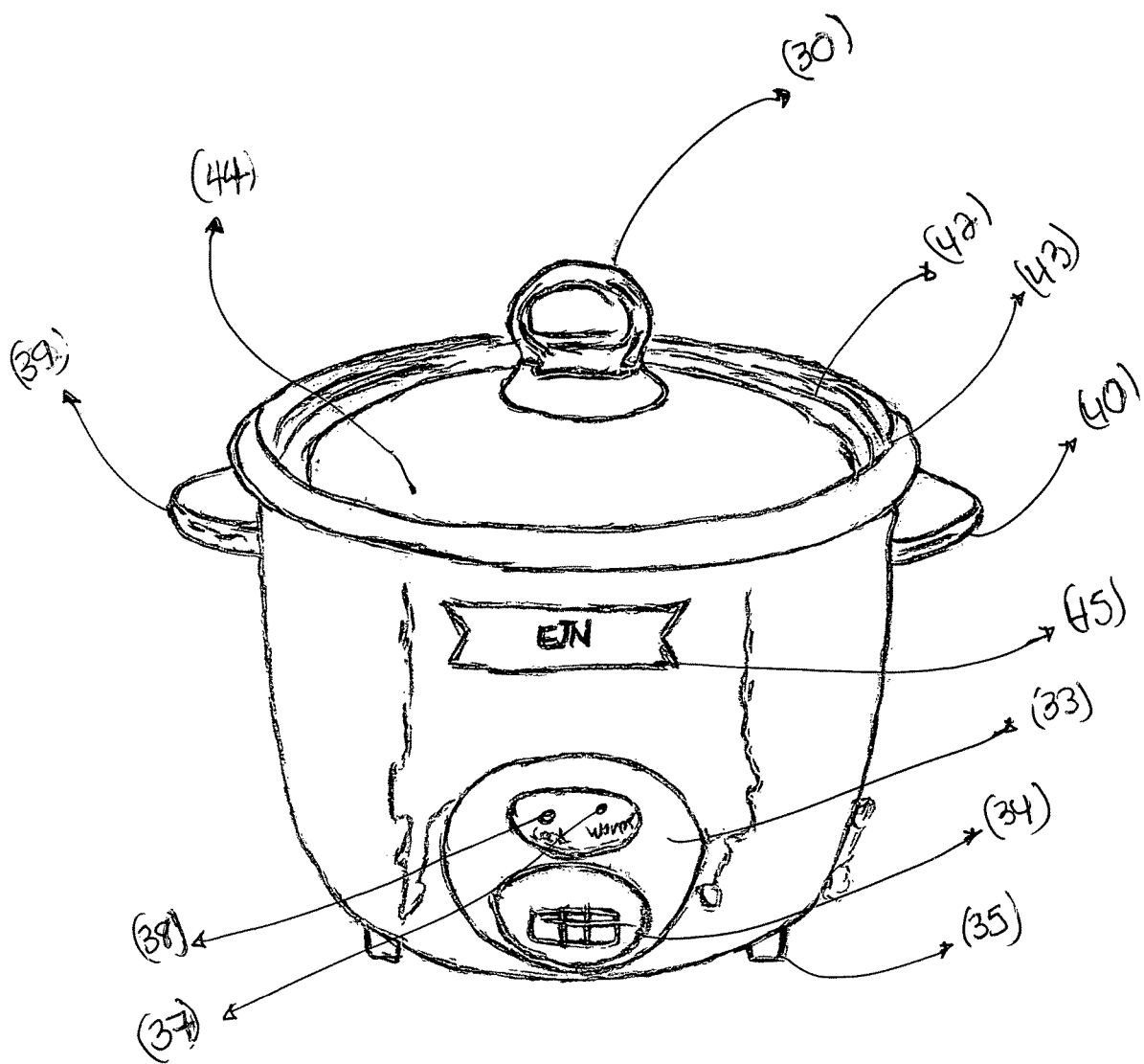
FIG. 10 is a full view of the very first EJN COOKER showing the exact design.

The EJN COOKER in FIG. 10 shows the design. Cool Lid handle (30). The Control Panel (33). The Cook switch (34). The right front feet (35). The Cooking indicator lamp (37). The Warming indicator lamp (38). Left Handles (39). Right Handles (40). Cooking bowl (42). Right side of the bowl (43). Inside of the bowl (44). EJN Logo Designs (45).

Figure 11:
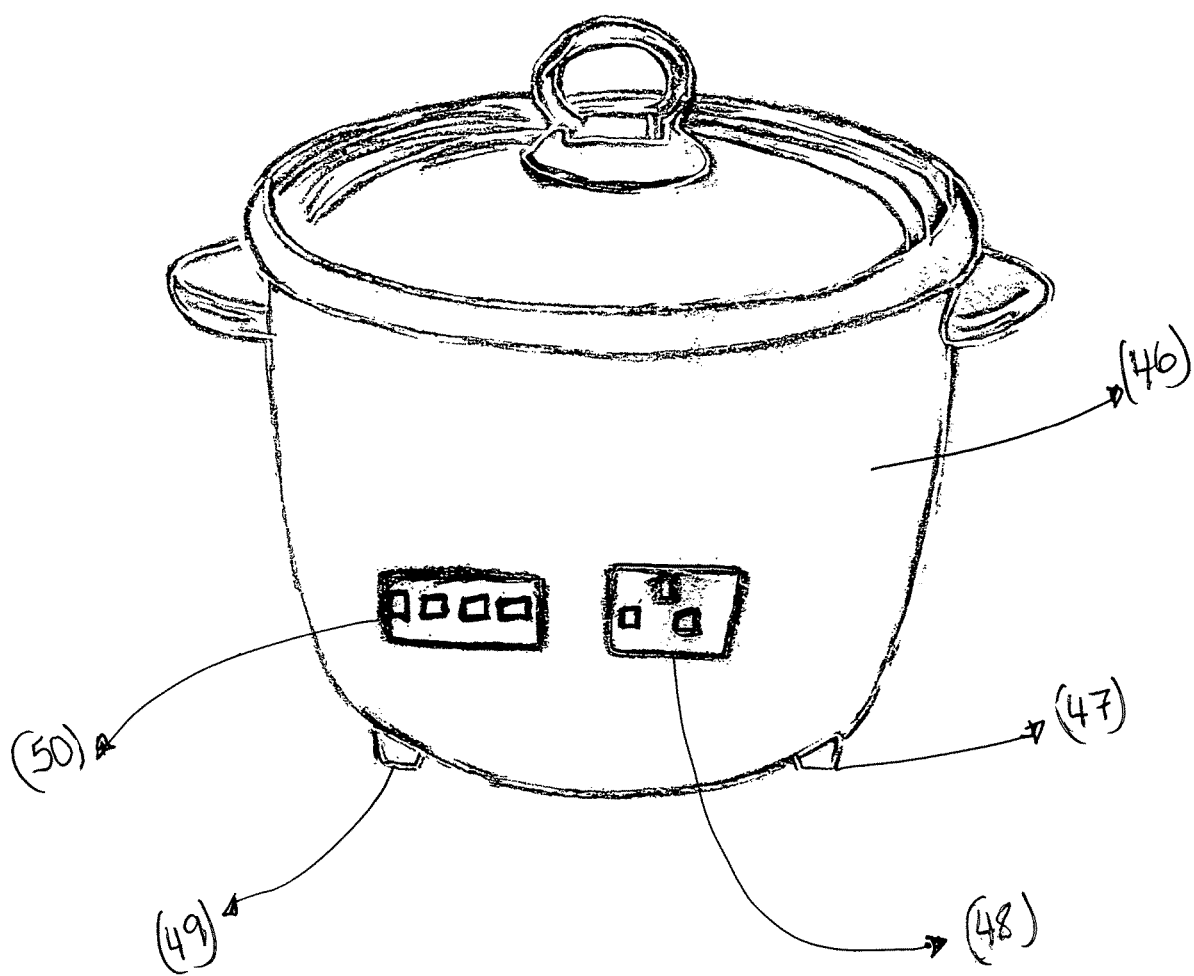
FIG. 11 is a view of the back of the first EJN COOKER.

FIG. 11 to shows the beautiful back design. Back of the Cooker (46) Left Back Leg (47). Magnetic socket for the power cable inlet/insert of the cooker (48) The Lithium-ION Battery socket inlet of the cooker (50). Right Back Leg (49)

Figure 12:
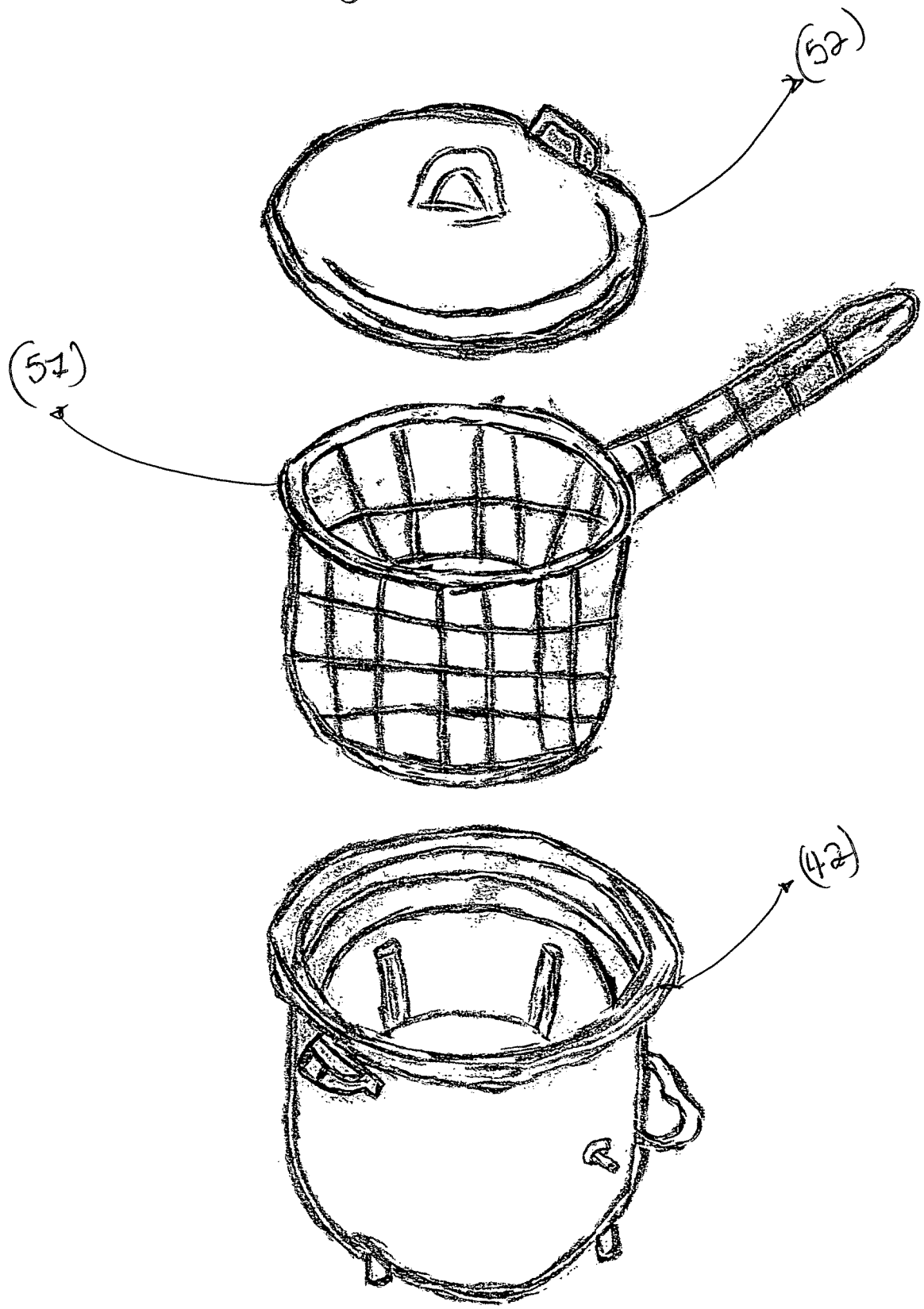
FIG. 12 is a full view of the second EJN COOKER showing full design.

FIG. 12 showing the top, frying net, bowl. Cooking bowl (42). The Frying Pan/Net (removable) (51), Top (52)

Figure 13:
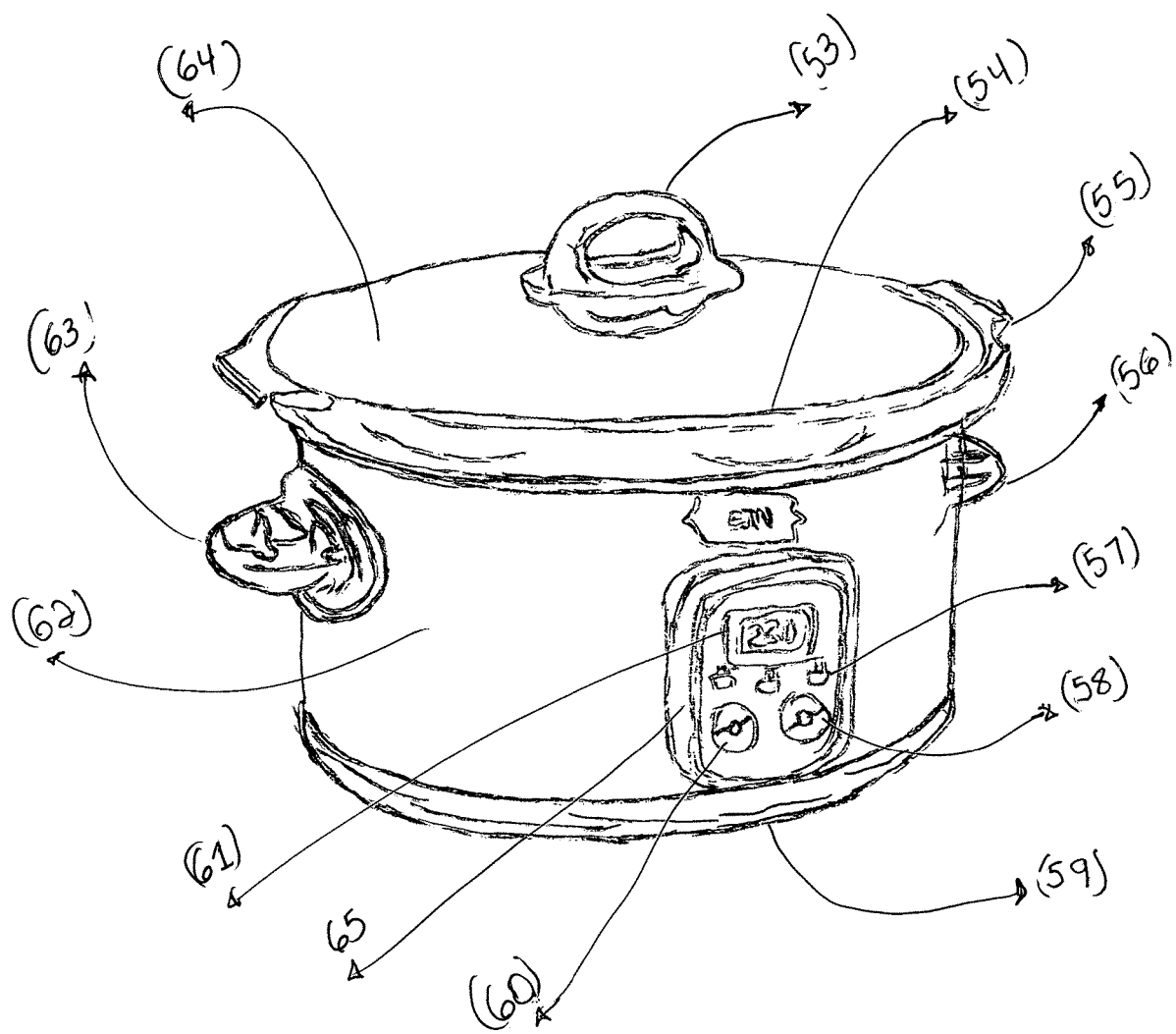
FIG. 13 is the full view of the back of the second EJN COOKER.

A Second EJN COOKER is shown in FIG. 13, the cool touch handle (53). The inside cooker (54). The cooking bowl (55). Right cool handle (56). The indicator lights (Min. Max. Warm) (57). The time button (58). The temperature button (60). Digital control panel (65). The digital timer display (61). The Stainless-steel outer (62). The left cool touch handle (63).

Figure 14:
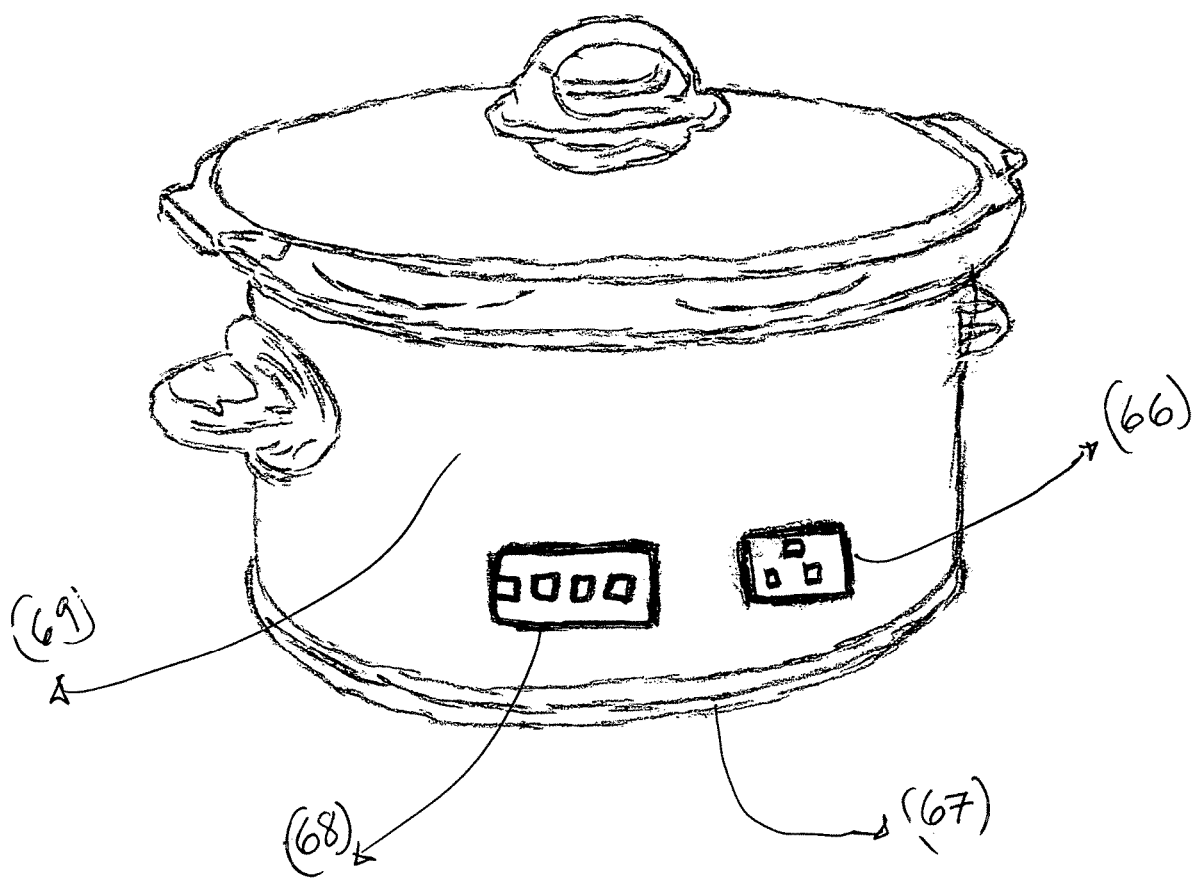
FIG. 14 is the third EJN COOKER showing full view of the design which is a COOKER POT designed to make cooking an absolute breeze; use it as a traditional rice cooker or make use of this multi-functional 7-in-1 pressure cooker that features 14 smart

FIG. 14 Magnetic socket for the power cable inlet/insert of the cooker (66). The Lithium-ION Battery socket inlet (68). The back stainless steel of the cooker (69). The lower bottom of the second cooker (67).

Figure 15:
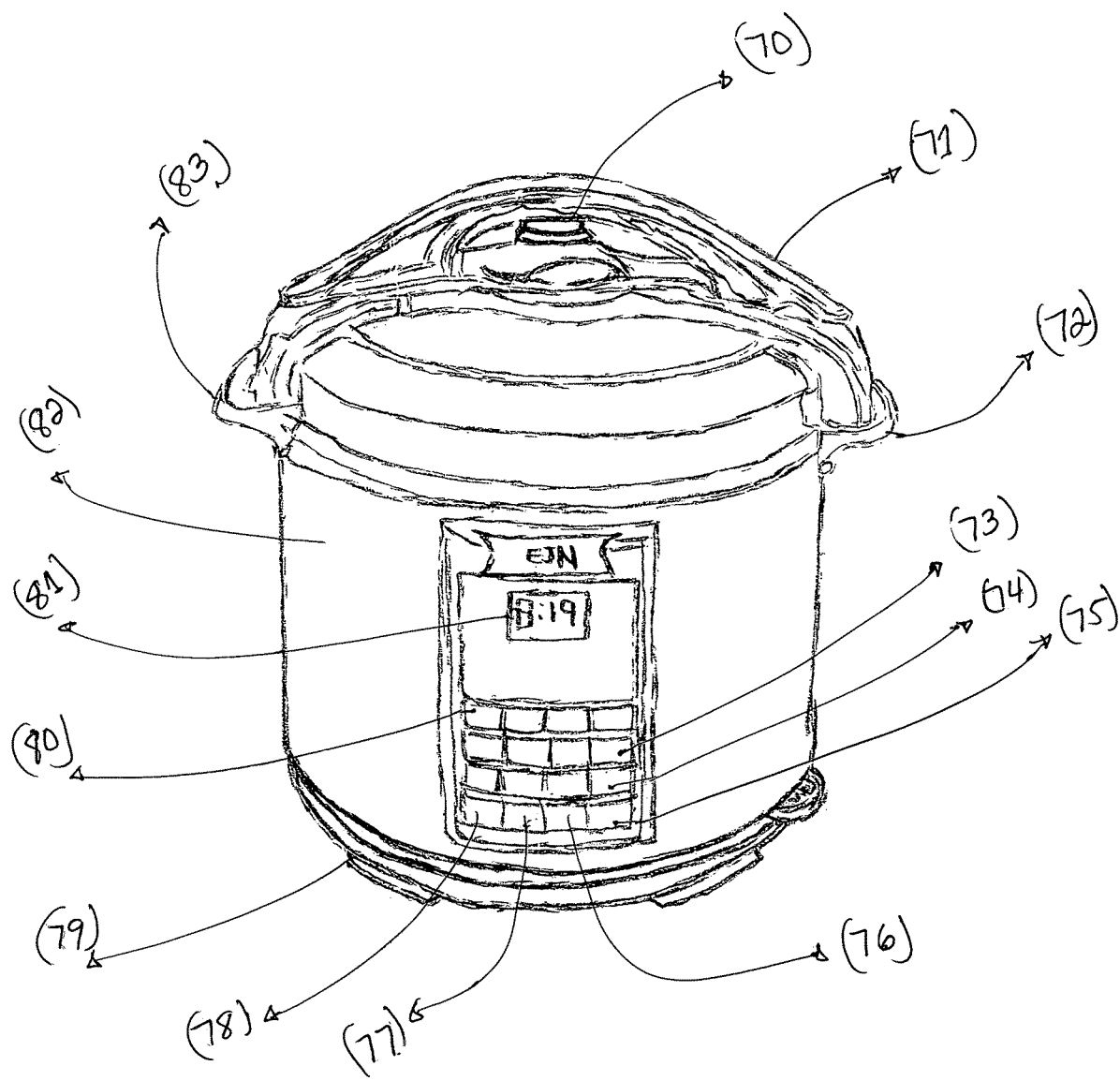
FIG. 15 is the full back view of the third EJN COOKER.

A third EJN Cooker is shown in FIG. 15. Second cool touch lid (safe) (70). The first cool touch lid (safe) (71). Right cool touch handle (72). The button to steam vegetables (73). The adjust button (74). The keep warm button (75). The timer button (76). The normal button (77). The sauté button (78). The feet (79). The slow cooker button (80). The digital timer button (81). The outer stainless steel (82). The left cool touch handle (83).

Figure 16:
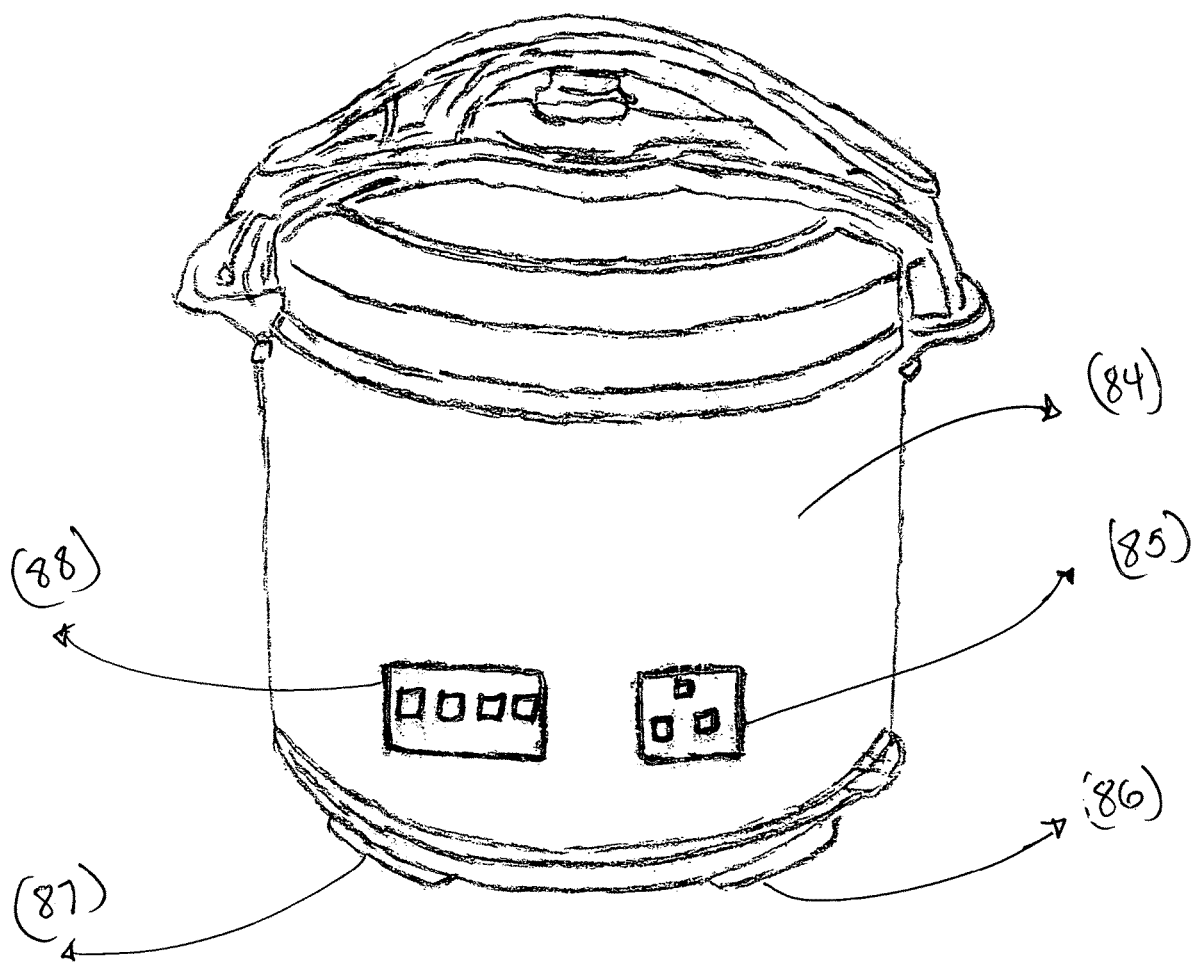
FIG. 16 is the full view of the third cooker top and bottom.

In FIG. 16 is the back the third EJN COOKER. The back of the pressure cooker stainless steel (84). Magnetic socket for the power cable inlet/insert of the cooker (85). The back left leg (86). The right back leg (87). The Lithium-ION Battery socket inlet (88).

Figure 17:
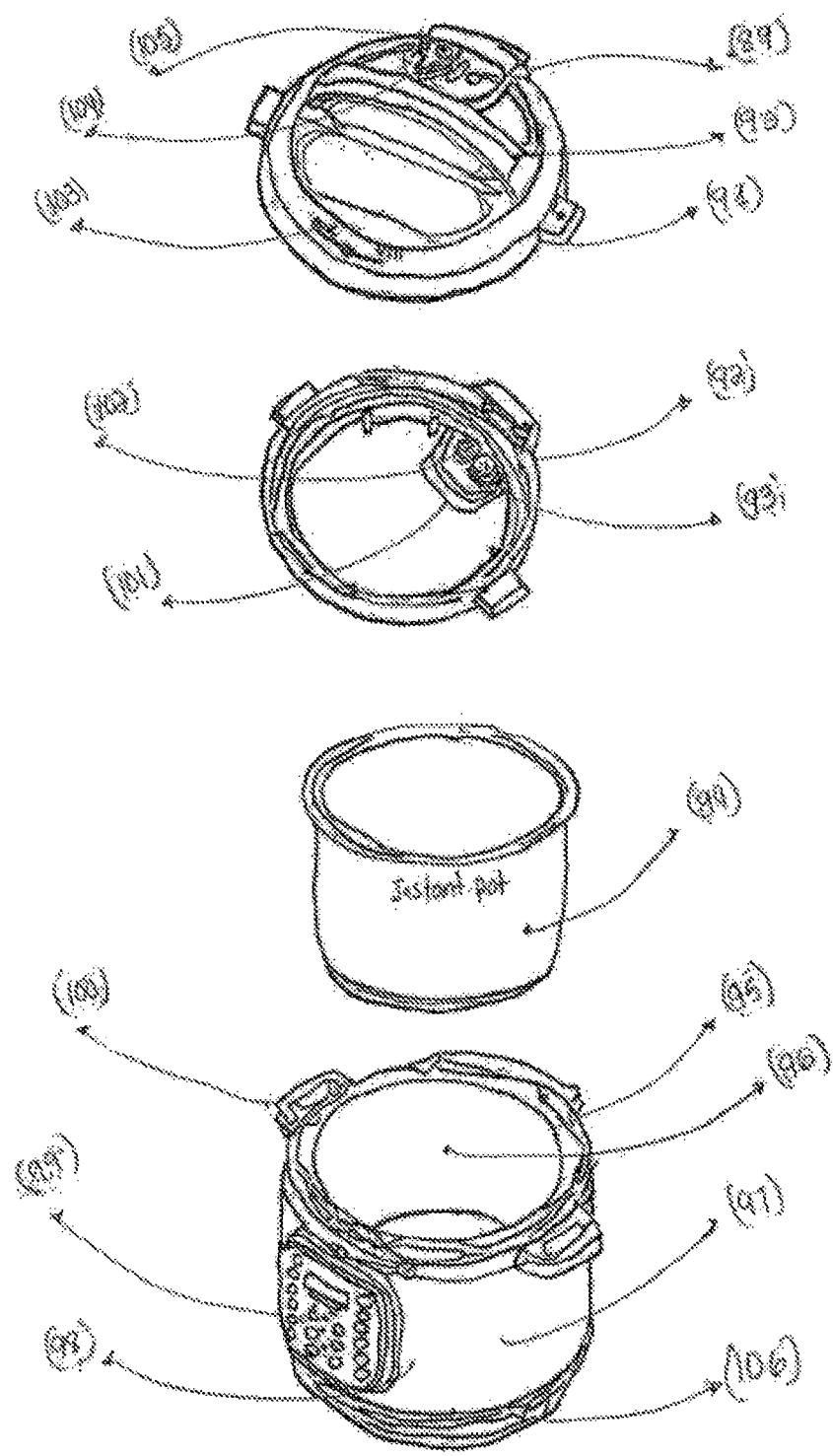
FIG. 17 is a view of the EJN CHARGER front side and bottom.

FIG. 17 showing the full designs inside and out. Float wave (89). The first cool touch lid (safe) (71). Lift top handle (90). Lid Fins (91). Locking pins (92). Anti-Black shield (93). Inner Pot (94). Condensation Rim (95). Inside Outer pot (96). Cooker Base (97). Heating Element (106). Base Power Socket "Rear" (98). Control Panel (99). Left Cooker Handles (83). Steam release pipe Beneath Anti-Black shield (101). Float wave silicone cap (102). Steam Release Pipe beneath Steam Release handles (103). Lid Position Marker (104). Steam Release handles (105).

Figure 18:
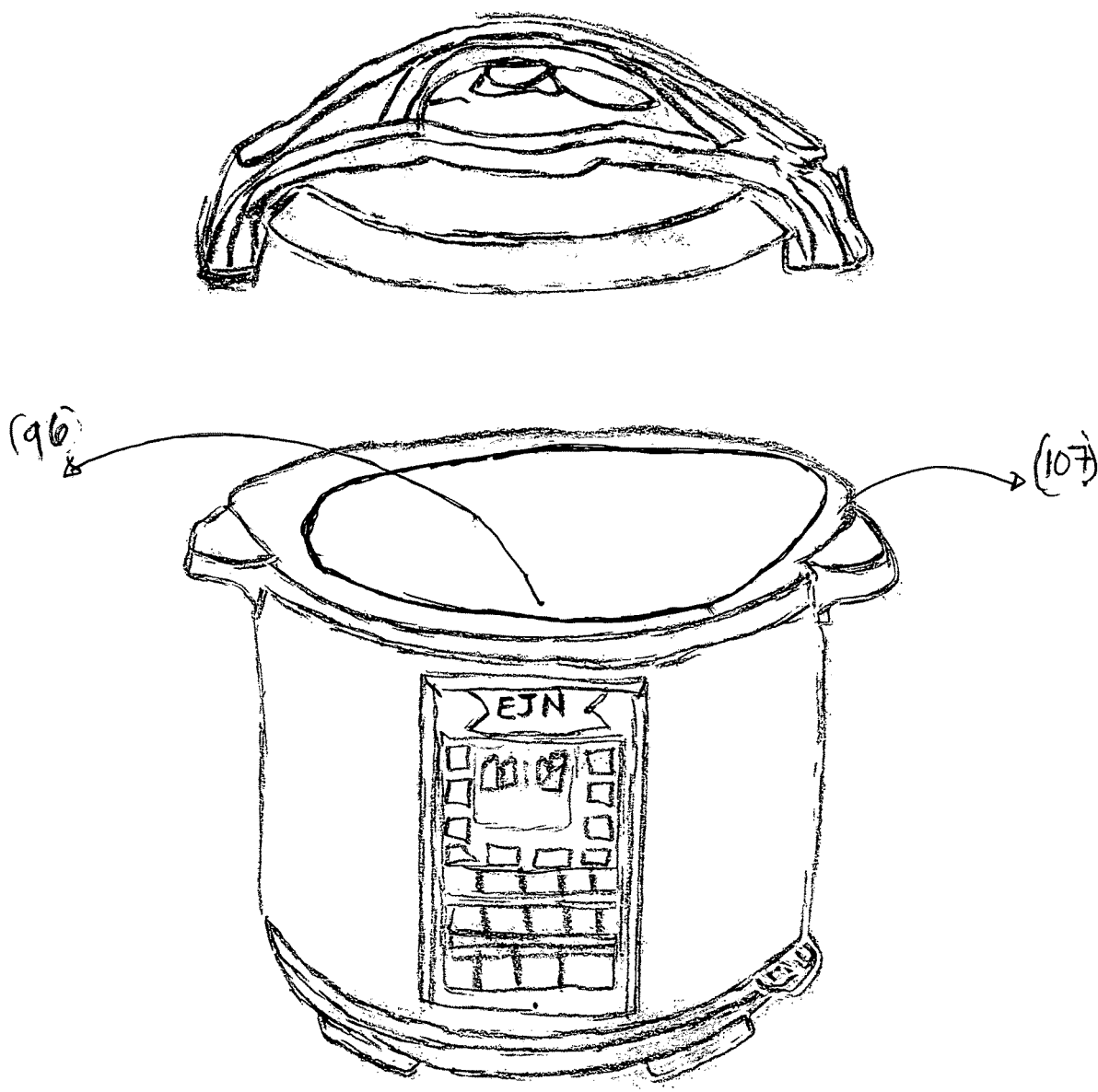
FIG. 18 is a view of the EJN CHARGER with the EJN BATTERY inside showing the left side, front side and top side.

FIG. 18 is the third EJN COOKER showing its lid, inside and bottom. Outer Pot (107) Condensation Rim (95).

Figure 19:
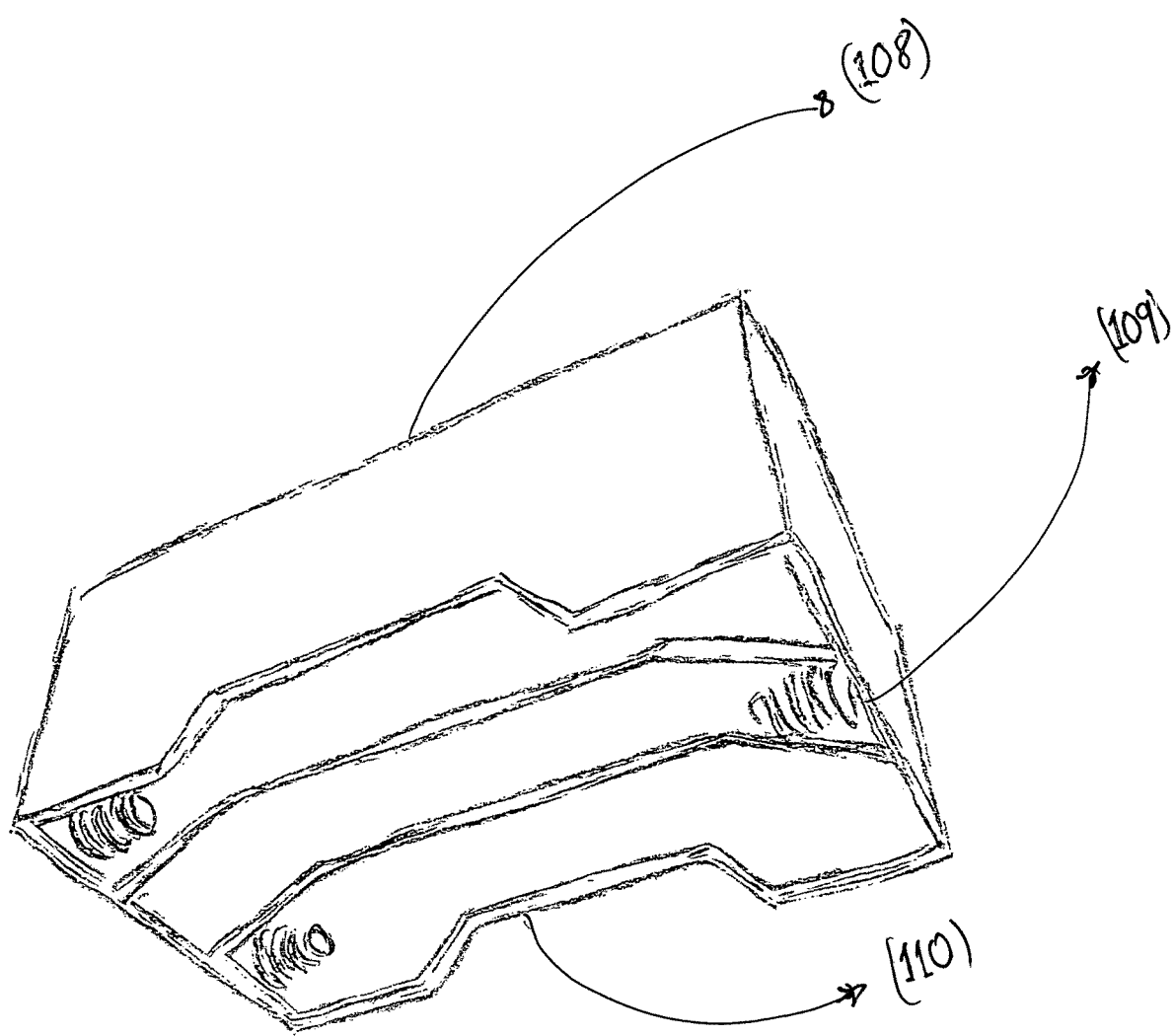
FIG. 19 is a view of how the CR123A batteries will insert in the EJN CHARGER

FIG. 19 is the charger that is to charge the EJN WATER HEATER and EJN COOKER Lithium-ION Battery, it work with in electric cord/Power Cable and 3 CR123A Batteries. The top of the EJN CHARGER (108) and location where the CR123A battery goes (109).

Figure 20:
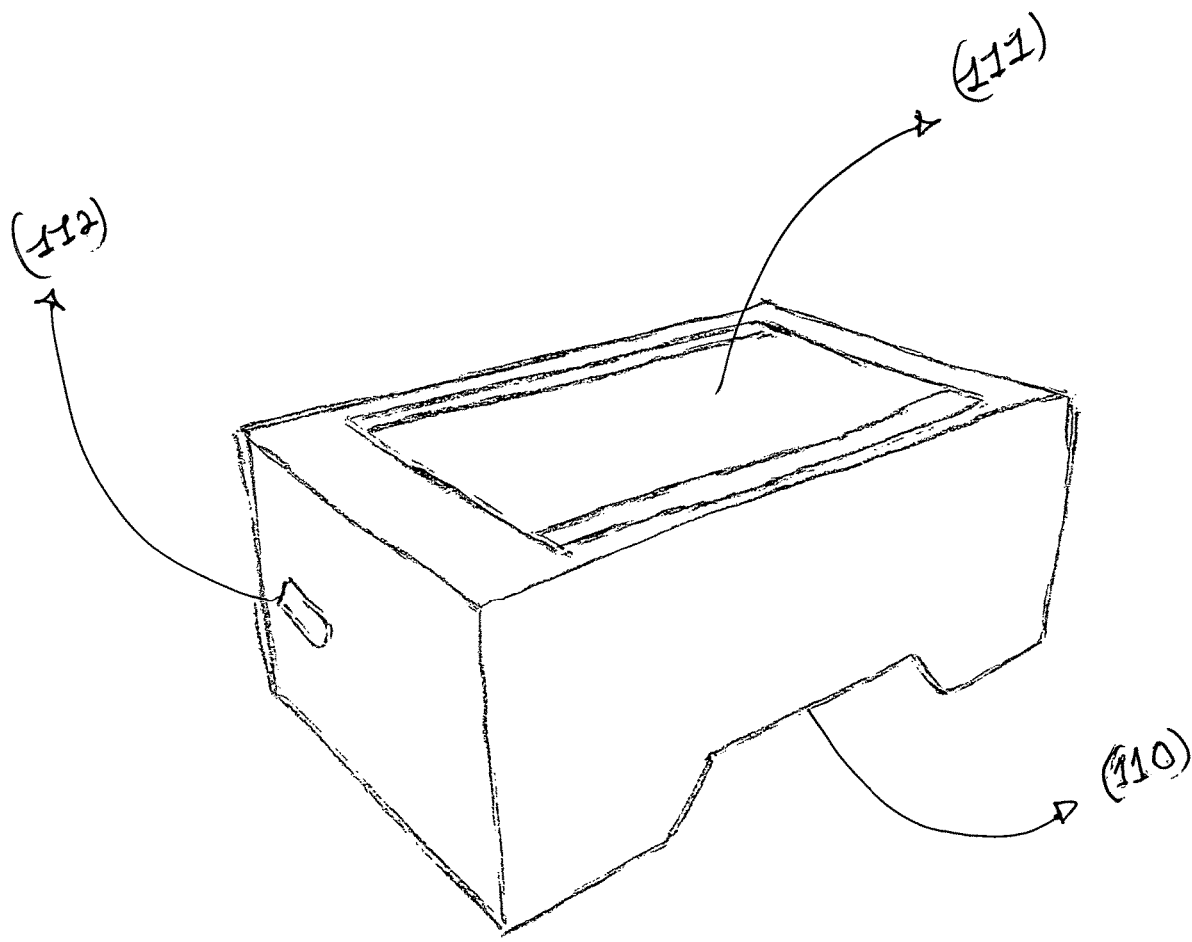
FIG. 20 is a full view of the EJN CHARGER design, showing the power cable insert.

FIG. 20 shows the inside bottom of the Charger (110). Lithium-ION Battery insert (111). Power cables insert (112)

Figure 21:
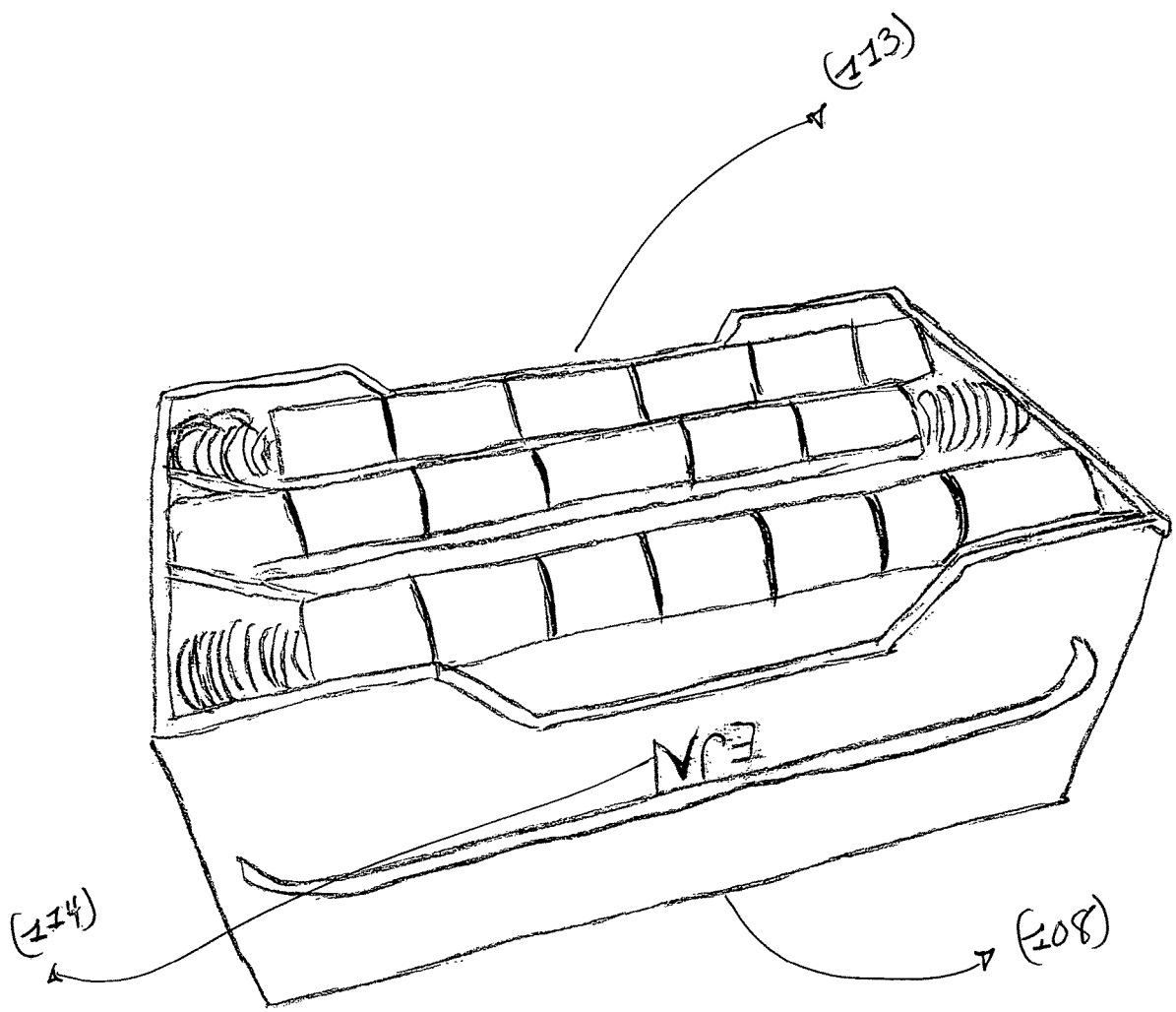
FIG. 21 is a view of the bottom, side, and front of the EJN CHARGER.

FIG. 21 is the top of the EJN CHARGER

Figure 22:
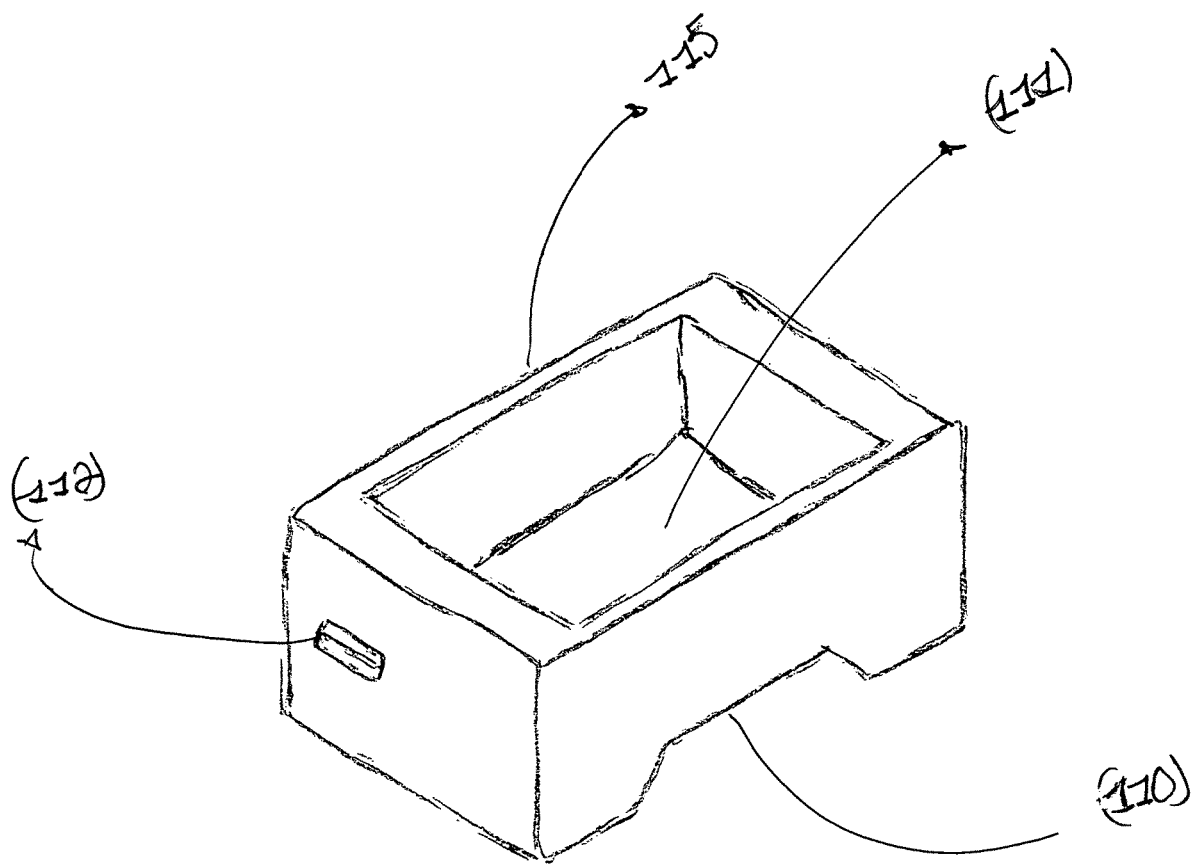
FIG. 22 is a view of the Lithium-ION Battery Charger

FIG. 22 it's the full view of the EJN CHARGER. FIG. 22 Where the CR123A battery goes (110) Lithium-ION Battery insert (111) Power cables insert (112). The top corner (115).

Figure 23:
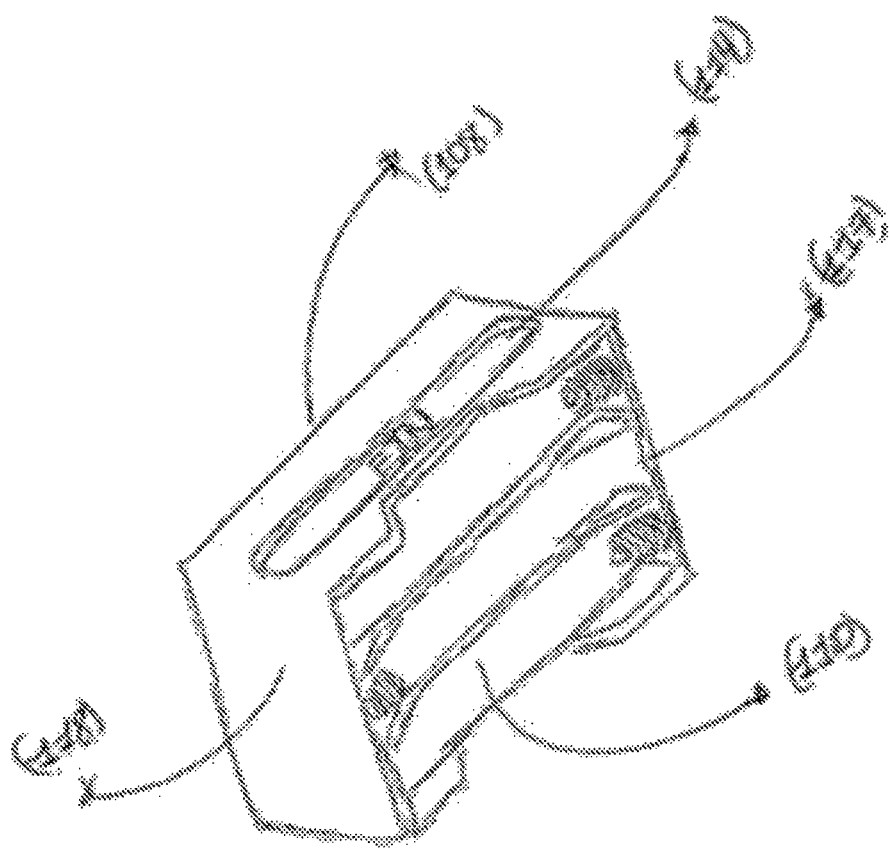
FIG. 23 is a perspective view of the EJN WATER HEATER Lithium-ION Battery Charger.

FIG. 23 the top of the EJN CHARGER (108) Where the CR123A battery goes (110). The left side corner (117)/Right side Corner (118).

Figure 24:
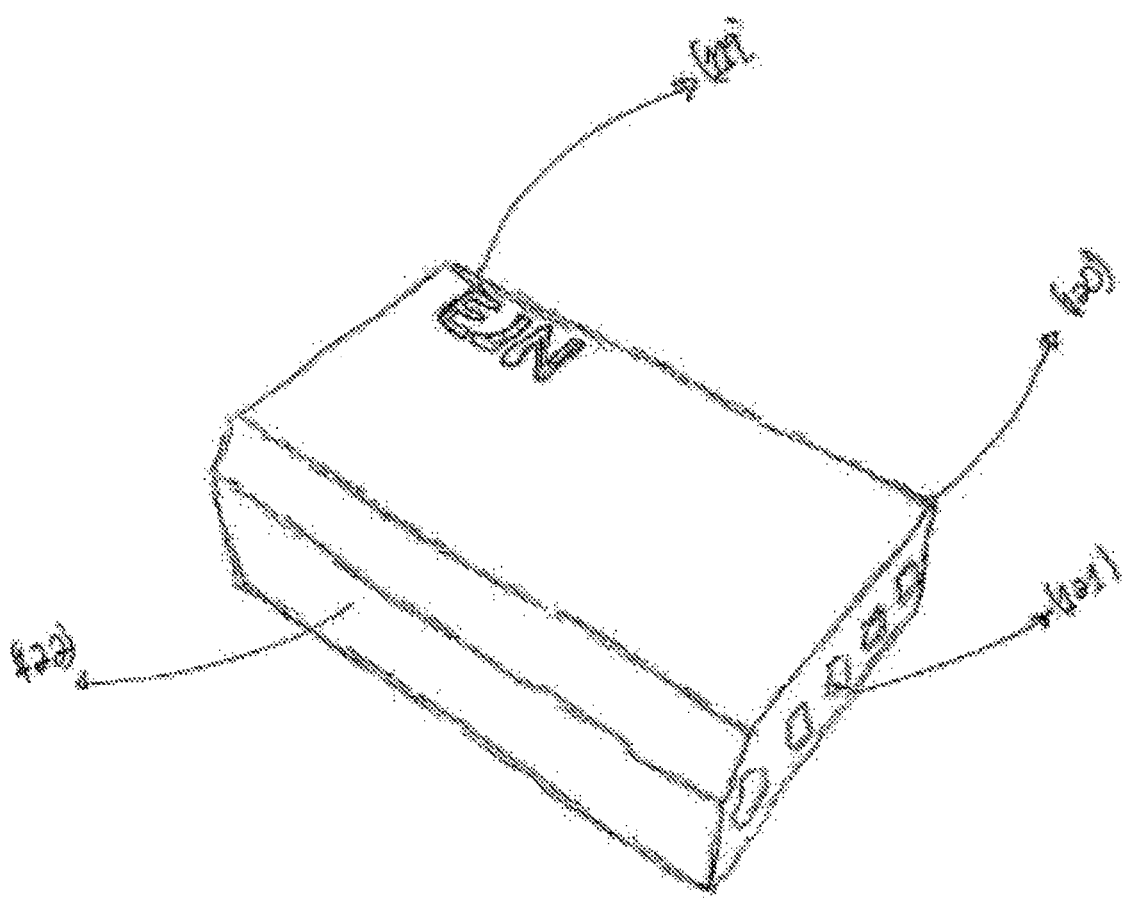
FIG. 24 is a view of the EJN Lithium-Ion Battery.

FIG. 24 Is a Lithium-ION battery that come with the EJN WATER HEATER and EJN COOKER, it last up to 12 hours and its rechargeable. The EJN Logo for the cooker (119) the top of the lithium-long battery (120) to insert into the EIN CHARGER (121) The Lithium-ION Battery Side (122).

EJN WATER HEATER and EJN COOKER will become quite popular for every household with electricity and without electricity, it will become popular for those who love to camp on camping sites, it will become popular for those who like to boil water and filter it for their babies, and with it lithium-ION battery will be a life saver for all.

EJN WATER HEATER and EJN COOKER will not only be popular, but wanted by everyone, with the use of electricity and lithium-ion battery, no one ever practice my invention before, the pipe in this invention contain a filter inside that will allow you to filter and drink your water, you can filter your water into the EJN WATER HEATER LARGE BOWL DISPENSER. However, the water heater cannot be used in counter height cabinets, it will be very difficult to install, and because the vapor outlet will be use while using the heater.

Accordingly, my invention come with its own feet and button to fold the feet and control panel for both electricity and battery using.

EJN Cooker 1

Enjoy precisely cooked foods every time with the EJN cooker. Say goodbye to standing over the hob checking your food isn't burning and the water isn't boiling over the side of the pan. There's no more worrying about timings, as this cooker promises perfect cook foods every time; its cool touch body protects your fingers and the toughened glass lid means you can take a peek on its progress! If your food is ready before you are, simply hit the cooker's 'keep warm' function.

EJN Cooker 2

EJN Cooker 2 is a cooker that can use to cook any type of foods, and can also use as a deep fryer to fry anything you will like to, it takes electricity and Lithium-ION Battery, Prepare your food according to the directions in your recipe. It is also good for outdoor cooking, such as camping, because you don't need electricity to use it outdoor, this EJN Cooker Pot comes with a Lithium-ION Battery that lasted up to 12 hours EJN Cooker 3

Introduce modern & fashionable kitchenware to your household

Prepare dishes a lot easier & in record time

Material: Stainless steel

Appliance capabilities: Pressure cooker, rice cooker, slow cooker, steaming, stewing, delay cooking Capacity (volume): 6 quart Lithium-ION Battery to use it outdoor Make your cooking easier than ever with the EJN Cooker Pot. Designed to make cooking an absolute breeze; use it as a traditional rice cooker or make use of this multi-functional 7-in-1 pressure cooker that features 14 smart programs to accommodate a variety of cooking needs—from soups, broths, rice & meats to even grandma's famous chicken recipe! This versatile steamer can do it all and that too in record time! Whether you choose to sauté your vegetables or you're whipping up a batch of your favorite foods, do it all with just the press of a button. Includes a stainless steel trivet, condensation collector, rice paddle, ladle, instruction manual & recipe booklet. Featuring a 24-hour delay start that allows for delayed cooking, this EJN Cooker Pot is perfect for busy lifestyles. The future has made way for smart electric pressure cookers that speeds up you're cooking by 2-6 times, say goodbye to those slow cookers/crockpots & to waiting around in the kitchen. With instant pot, your perfect meal is just a click away. There's a whole lot cooking in just one cooker. It is also good for outdoor cooking, such as camping, because you don't need electricity to use it outdoor, this EJN Cooker Pot comes with a Lithium-ION Battery that lasted up to 12 hours.

EJN Battery is a Rechargeable Lithium-ion Battery: The battery is design for EJN WATER HEATER and EJN COOKER. The battery is lightweight, very quickly recharging, long lasting, easy to install, reliable and solid construction; that incorporates the Lithium-ion technology to ensure maximum battery life and performance. The battery offers excellent capacity, the battery is recharged with EJN CHARGER. EJN BATTERIES are renewable, sustainable green energy batteries. They weigh less, last for more cycles, and they're made from 100% safe, nontoxic, renewable energy that can be charged and discharged over and over again. These batteries are designed to last 3000 cycles up to 100% depth of discharge, at which point the battery will still hold 75 to 80% of its energy capacity.

EJN CHARGER: Is the charger that is to charge the EJN WATER HEATER and EJN COOKER Lithium-ION Battery, it work with an electric cord/Power Cable and 3 CR123A Batteries and you can use 3 CR123A Batteries for the charger to charge The Lithium-ION Battery when there's no electricity.

The EJN Charger is the dedicated lithium-ion battery charger for the EJN Battery. Charging time is around 3½ Hours. Compatible with the international power supply of 100˜240V AC. It also takes 3 CR123A Batteries The water must be potable, free of corrosive chemicals, sand, dirt, and other contaminates. It is up to the installer to ensure the water does not contain corrosive chemicals or elements that can damage the heat exchanger. Potable water is defined as drinkable water supplied from utility or well water in compliance with EPA secondary maximum contaminant levels (40 CFR Part 143.3). If the water contains contaminants higher than outlined by the EPA, water treatment is recommended and additional, more frequent maintenance may be required. If you suspect that your water is contaminated in any way, discontinue use of the appliance and contact an authorized technician or licensed professional.

EJN Water Heater
Features
Heavy Duty Construction
Plastic will not rust, scratch or dent eliminating damage and is maintenance free
High Efficiency
2" thick polyurethane foam insulation reduces standby heat loss to maximize operating efficiency
Advanced Heating Element
Low watt density element and all copper/brass construction provides protection against mineral build up. No Sacrificial Anode Rod
Reduces operation expenses by eliminating periodic inspection and replacement costs associated with maintaining an anode rod
Adjustable Thermostat Provides adequate temperature control, while high limit controls protect against overheating.
Products Specifications
Tank: Stainless steel inside and Clear Hard outside Plastic
Capacities: 20 thru 80 Gallons
Voltages: 120 thru 480 Volt
Intel Size: ¾"
Drain Size: ¾" GHT
Outlet Size: ¾"
Thermostat Range: 110 thru 170 F (Surface)
HI-Limit: 190 Manual Reset
Batteries: Last up to 12 hours
Battery Type: Lithium-ION Battery
Rational
Width: 70½ Inches
Depth: 60⅜ Inches
Height: 50 Inches
Orientation: Horizontal
Boiler: Yes
Door Type: Stainless Steel
General Specifications
The EJN WATER HEATER is all welded heavy Stainless Steel Inside and Clear Hard outside Plastic, for 200 PSI working pressure and test for 300 PSI.

Plumbing
¾" Combination cold/hot water inlet and stainless steel elements inside are more durable and resistant to corrosion, the longest lasting elements, provide adequate temperature control, while high limit controls protect against overheating and leaks.
Heavy Duty Insulation
Assists high recovery rates and low standby heat loss
Adjustable Thermostat
Provides adequate temperature control, while high limit controls protect against over heating
Electrical
Copper sheathed immersion heating elements with low watt density for prolonged life—up to 12 KW in 120, 208, 240, 277, 480 volt single phase. An adjustable surface thermostat operates in 110-170° F. range. Integral hi-limit with manual reset button for over-temperature protection is factory set at 190° F. Upper and lower element configurations are factory wired for non-simultaneous operation.
Jacket
The exterior protective jacket is constructed from high impact composite material which cannot rust or corrode and does not require painting.
Immersion thermostat specify 100-180° F. will be available
Heating elements wired for simultaneous operation
Alternate voltages will be available
Vertical construction will be available
EJN Cookers Contains Three Most Fascinated Cookers
EJN COOKER ONE: Is a cooker that come with both electricity and batteries, that can be used to cook food, fry food, etc. It is a food grade hard outside plastic and stainless steel interior. This cooker can be used to go camping and cook in it your favorite meal under the Moonlight using just the battery.

Imagine there's no electricity and you need to cook something for yourself or your family EJN COOKER is the way to go, the battery can last up 12 hours and if you need to charge the EJN CHARGER that come with the cooker and the battery is great for charging.

EJN COOKER is a premium quality pan that can be used to create healthier meals and foods such as meats, stew, vegetables, fish, pasta, noodles, rice, beans and more.
Features
For indoor and outdoor use
Technical specification Rated voltage
Enjoy precisely cooked foods every time with the EJN cooker. Say goodbye to standing over the hob checking your food isn't burning and the water isn't boiling over the side of the pan.

There's no more worrying about timings, as this cooker promises perfect cook foods every time; its cool touch body protects your fingers and the toughened glass lid means you can take a peek on its progress! If your food is ready before you are, simply hit the cooker's 'keep warm' function.
500 watts.
Capacity 1.5 liters/8 cups.
Removable pot.
Non-stick bowl.
Toughened glass lid.
2 settings.
Cool touch body.
Keep warm function.
Electricity and Lithium-ION Battery
EJN Cooker Two: is a cooker that can use to cook any type of foods, and can also use as a deep fryer to fry anything you will like to, it takes electricity and Lithium-ION Battery, Prepare your food according to the directions in your recipe. It is also good for outdoor cooking, such as camping, because you don't need electricity to use it outdoor, this EJN Cooker Pot comes with a Lithium-ION Battery that lasted up to
12 hours
120 V
60 Hz
Power Consumptions: 240 Watts
Battery: Lithium-ION Battery
EJN Cooker Three
Highlights
Introduce modern & fashionable kitchenware to your household
Prepare dishes a lot easier & in record time
Material: Stainless steel
Appliance capabilities: Pressure cooker, rice cooker, slow cooker, steaming, stewing, delay cooking
Capacity (volume): 6 quart Lithium-ION Battery to use it outdoor and make your cooking easier than even with the EJN Cooker Pot. Designed to make cooking an absolute breeze; use it as a traditional rice cooker or make use of this multi-functional 7-in-1 pressure cooker that features 14 smart programs to accommodate a variety of cooking needs—from soups, broths, rice & meats to even grandma's famous chicken recipe! This versatile steamer can do it all and that too in record time! Whether you choose to sauté your vegetables or you're whipping up a batch of your favorite foods, do it all with just the press of a button. Includes a stainless steel trivet, condensation collector, rice paddle, ladle, instruction manual & recipe booklet. Featuring a 24-hour delay start that allows for delayed cooking, this EJN Cooker Pot is perfect for busy lifestyles.

The future has made way for smart electric pressure cookers that speeds up you're cooking by 2-6 times, say goodbye to those slow cookers/crock-pots & to waiting around in the kitchen. With instant pot, your perfect meal is just a click away. There's a whole lot cooking in just one cooker. It is also good for outdoor cooking, such as camping, because you don't need electricity to use it outdoor, this EJN Cooker Pot comes with a Lithium-ION Battery that lasted up to 12 hours.
Material: Stainless Steel
Dimensions (Overall): 13 inches (H)×12 inches (W)×12 inches (D)
Weight: 15 pounds
Capacity (Volume): 6 quart
Wattage Output: 1000 watts
Appliance Capabilities: Pressure Cooker, Rice Cooker, Slow Cooker, Steaming, Stewing, browns, Delay Cooking
Battery: Lithium-ION battery
EJN BATTERY: Is a Lithium-ION battery that come with the EJN WATER HEATER and EJN COOKER, it last up to 12 hours and its rechargeable The embodiments of the invention in which an exclusive property or privilege is claimed are defined as follows:

1. A water heater apparatus comprising:
   a housing comprising a top, a bottom, a front, a back, a left side, and a right side;
   a control panel and a digital control panel located on the front;
   a handle to allow the user to move the housing, a lithium-ion battery socket, a power cable socket located on the left side;
   a handle to allow a user to move the housing, a tank drain pipe located on the right side to allow hot water to be dispensed from the housing;
   the top including an opening defining a cold water inlet, said opening covered by a lift top;
   the top further including a vapor outlet which allows water vapor to exit the housing, the vapor outlet comprising a button which can be pressed to allow the vapor outlet to be folded;
   the back including a handle to allow a user to move the housing comprising a gripping surface and a button allowing the gripping surface to be stored when not in use;
   the bottom comprising a plurality of legs, each leg comprising a button allowing the legs to be stored away when not in use;
   a power cable connectable to the power cable socket;
   a lithium ion battery connectable to the lithium-ion battery socket;
   wherein the device is operable by power supplied by the power cable by way of a conventional power source or the lithium ion battery when a conventional power source is unavailable to heat water stored within the housing such that a user may use the device.

\* \* \* \* \*